United States Patent
Mo et al.

(10) Patent No.: US 11,146,457 B2
(45) Date of Patent: Oct. 12, 2021

(54) TRAIN NETWORK NODE AND CANOPEN-BASED TRAIN NETWORK NODE MONITORING METHOD

(71) Applicant: BYD COMPANY LIMITED, Shenzhen (CN)

(72) Inventors: Junsheng Mo, Shenzhen (CN); Wenxiao Zeng, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 124 days.

(21) Appl. No.: 16/625,526

(22) PCT Filed: Jun. 20, 2018

(86) PCT No.: PCT/CN2018/092047
§ 371 (c)(1),
(2) Date: Dec. 20, 2019

(87) PCT Pub. No.: WO2018/233642
PCT Pub. Date: Dec. 27, 2018

(65) Prior Publication Data
US 2021/0144068 A1 May 13, 2021

(30) Foreign Application Priority Data
Jun. 21, 2017 (CN) .......................... 201710478215.8

(51) Int. Cl.
*H04L 12/24* (2006.01)
*H04L 12/26* (2006.01)
*H04L 12/40* (2006.01)

(52) U.S. Cl.
CPC .............. *H04L 41/16* (2013.01); *H04L 12/40* (2013.01); *H04L 43/08* (2013.01); *H04L 43/10* (2013.01); *H04L 2012/40215* (2013.01)

(58) Field of Classification Search
CPC ......... H04L 41/16; H04L 43/10; H04L 12/40; H04L 43/08; H04L 2012/40215
(Continued)

(56) References Cited

U.S. PATENT DOCUMENTS

| 2006/0253859 | A1 | 11/2006 | Dai et al. |
| 2007/0115868 | A1* | 5/2007 | Chen ................. H04W 4/08 370/315 |

(Continued)

FOREIGN PATENT DOCUMENTS

| CN | 101854300 A | 10/2010 |
| CN | 102088372 A | 6/2011 |
| EP | 2882233 A1 | 6/2015 |

OTHER PUBLICATIONS

The World Intellectual Property Organization (WIPO) International Search Report for PCT/CN2018/092047 dated Aug. 28, 2018 5 Pages.

*Primary Examiner* — Younes Naji
*Assistant Examiner* — Da T Ton
(74) *Attorney, Agent, or Firm* — Anova Law Group, PLLC

(57) ABSTRACT

The present disclosure discloses a train network node and a CANopen-based train network node monitoring method. The method includes: obtaining, by a train network node, an offline duration and a heartbeat packet transmission period based on a pre-configured network node list, where the offline duration is set on an offline timer corresponding to each node related to the network node, and the heartbeat packet transmission period is set on a heartbeat timer; and comparing the offline duration that is set on the offline timer corresponding to each node with the heartbeat packet transmission period that is set on the heartbeat timer, and determining an offline monitoring mechanism of each node based on a comparison result.

18 Claims, 12 Drawing Sheets

(58) Field of Classification Search
USPC .......................................................... 709/224
See application file for complete search history.

(56) References Cited

U.S. PATENT DOCUMENTS

| | | | |
|---|---|---|---|
| 2009/0168806 A1* | 7/2009 | Van de Steeg | H04L 12/40006 370/498 |
| 2010/0013625 A1* | 1/2010 | Kouzan | H04M 11/04 340/508 |
| 2011/0161538 A1* | 6/2011 | Decker | G06F 11/2005 710/110 |
| 2013/0290542 A1* | 10/2013 | Watt | H04L 29/08153 709/226 |
| 2014/0121785 A1* | 5/2014 | Ismail | H04L 41/08 700/3 |
| 2014/0189131 A1* | 7/2014 | Schmoetzer | H04L 47/70 709/226 |
| 2015/0067819 A1* | 3/2015 | Shribman | H04L 67/06 726/12 |
| 2015/0146544 A1* | 5/2015 | Liu | H04L 1/08 370/248 |
| 2019/0319956 A1* | 10/2019 | Yang | H04L 63/10 |
| 2020/0389863 A1* | 12/2020 | Qiu | H04L 67/141 |

\* cited by examiner

A train network node obtains a breakdown duration and a heartbeat packet transmission period based on a pre-configured network node list, where the breakdown duration is set on a breakdown timer corresponding to each node related to the network node, and the heartbeat packet transmission period is set on a heartbeat timer — S101

Compare the breakdown duration that is set on the breakdown timer corresponding to each node with the heartbeat packet transmission period that is set on the heartbeat timer, and determine a breakdown monitoring manner of each node based on a comparison result — S102

FIG. 1

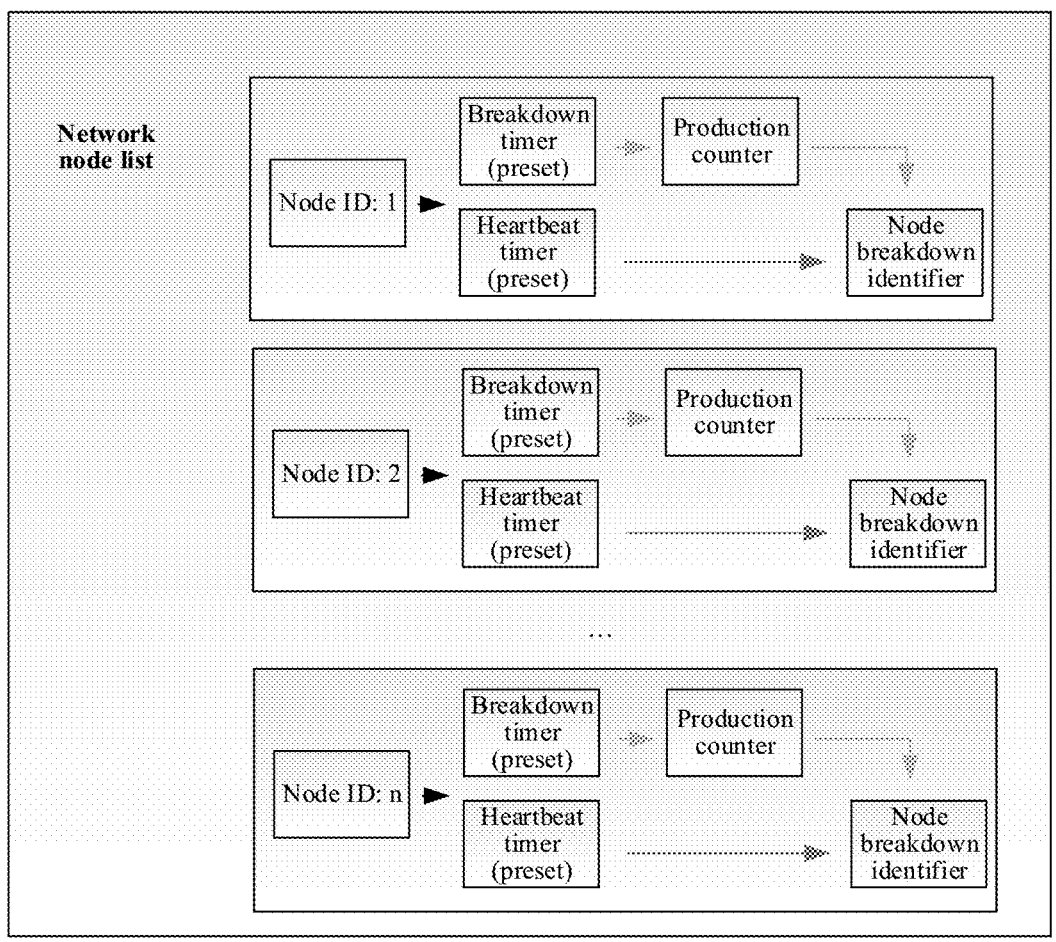

FIG. 2

TRAIN NETWORK NODE AND CANOPEN-BASED TRAIN NETWORK NODE MONITORING METHOD

CROSS-REFERENCE TO RELATED APPLICATIONS

This application is a national phase entry under 35 U.S.C. § 371 of International Application No. PCT/CN2018/092047, filed on Jun. 20, 2018, which claims priority to Chinese Patent Application No. 201710478215.8, filed by BYD Company Limited on Jun. 21, 2017 and entitled "TRAIN NETWORK NODE AND CANOPEN-BASED TRAIN NETWORK NODE MONITORING METHOD", content of all of which is incorporated herein by reference in its entirety.

FIELD

The present disclosure relates to the field of vehicle communications technologies and, in particular, to a train network node and a CANopen-based train network node monitoring method.

BACKGROUND

Currently, one technology that is widely applied to a train communications network is a Train Communications Network (TCN) bus technology. A TCN covers four types of buses: multifunction vehicle bus (MVB), wire train bus (WTB), Ethernet bus, and controller area network (CAN) fieldbus. In the design requirements for the four types of buses MVB, WTB, Ethernet, and CAN, a common requirement is network redundancy design. Network redundancy means that each communications network has a standby network. To be specific, each node on the network is connected in a dual-line mode, that is, through a line A and a line B. When the network is faulty, communication can be implemented by using the standby network. This ensures smooth exchange of data of all products on the network and high availability of an operating environment of the train communications network.

Generally, if data exchange is performed by using a CAN bus in the design of the train communications network, the design is mostly based on CANopen (a high-level communications protocol based on a CAN bus, which is a fieldbus that is commonly used in industrial control currently). The CANopen is defined as a standardized application layer protocol that is designed based on the CAN bus. The CANopen protocol supports a complete network management mechanism for traditional CANs, to support network redundancy design. Currently, all CANopen-based redundancy network designs require that all network nodes should transmit data on two lines simultaneously, but by default, receive the data from only an active network. When the active network of one or more slave nodes breaks down, a node that receives the data switches to the standby network to receive the data of such slave nodes.

SUMMARY

The present disclosure is directed to resolve one of the foregoing technical problems at least to some extent.

A first objective of the present disclosure is to provide a CANopen-based train network node monitoring method. According to this method, after being powered on, a node automatically applies an appropriate node offline monitoring mechanism to nodes related to the node, thereby improving accuracy of a node detection result determined, helping improve redundancy effects of a train network, and ensuring sound operation of an entire train.

A second objective of the present disclosure is to provide a train network node.

A third objective of the present disclosure is to provide a computer device.

A fourth objective of the present disclosure is to provide a storage medium.

To fulfill the foregoing objectives, an embodiment in a first aspect of the present disclosure provides a train network node and a CANopen-based train network node monitoring method, including: obtaining, by a train network node, an offline duration and a heartbeat packet transmission period based on a pre-configured network node list, where the offline duration is set on an offline timer corresponding to each node related to the network node, and the heartbeat packet transmission period is set on a heartbeat timer; and comparing the offline duration that is set on the offline timer corresponding to each node with the heartbeat packet transmission period that is set on the heartbeat timer, and determining an offline monitoring mechanism of each node based on a comparison result. According to the train network node and the CANopen-based train network node monitoring method provided in the embodiments of the present disclosure, the train network node obtains, based on a pre-configured network node list, the offline duration that is set on the offline timer corresponding to each node related to the network node, and the heartbeat packet transmission period that is set on the heartbeat timer. The train network node compares the offline duration that is set on the offline timer corresponding to each node with the heartbeat packet transmission period that is set on the heartbeat timer, and determines an offline monitoring mechanism of each node based on a comparison result. In this way, after being powered on, a node automatically applies an appropriate node offline monitoring mechanism to nodes related to the node, thereby improving accuracy of a node detection result determined, helping improve redundancy effects of a train network, and ensuring sound operation of an entire train.

To fulfill the foregoing objectives, an embodiment in a second aspect of the present disclosure provides a train network node, including: an obtaining module, configured to obtain an offline duration and a heartbeat packet transmission period based on a pre-configured network node list, where the offline duration is set on an offline timer corresponding to each node related to the network node, and the heartbeat packet transmission period is set on a heartbeat timer; a comparison module, configured to compare the offline duration that is set on the offline timer corresponding to each node with the heartbeat packet transmission period that is set on the heartbeat timer; and a determining module, configured to determine a offline monitoring mechanism of each node based on a comparison result.

According to the train network node provided in the embodiment of the present disclosure, the train network node obtains, based on the pre-configured network node list, the offline duration that is set on the offline timer corresponding to each node related to the network node, and the heartbeat packet transmission period that is set on the heartbeat timer. The train network node compares the offline duration that is set on the offline timer corresponding to each node with the heartbeat packet transmission period that is set on the heartbeat timer, and determines the offline monitoring mechanism of each node based on the comparison result. In this way, after being powered on, a node automatically applies an appropriate node offline monitoring mechanism to nodes related to the node, thereby improving accuracy of a node detection result determined, helping improve redundancy effects of a train network, and ensuring sound operation of an entire train.

To fulfill the foregoing objectives, an embodiment in a third aspect of the present disclosure provides a computer device, including a memory, a processor, and a computer program that is stored in the memory and executable in the processor. When executing the computer program, the processor implements the CANopen-based train network node monitoring method according to the embodiment in the first aspect of the present disclosure.

To fulfill the foregoing objectives, an embodiment in a fourth aspect of the present disclosure provides a storage medium for storing an application. The application is configured to execute the CANopen-based train network node monitoring method according to the embodiment in the first aspect of the present disclosure.

Other aspects and advantages of the present disclosure will be given in the following description, some of which will become apparent from the following description or may be determined from practices of the present disclosure.

BRIEF DESCRIPTION OF THE DRAWINGS

The foregoing and/or additional aspects and advantages of the present disclosure will become apparent and comprehensible in the description made with reference to the following accompanying drawings, where:

FIG. 1 is a flowchart of a CANopen-based train network node monitoring method according to an embodiment of the present disclosure;

FIG. 2 is a schematic structural diagram of a network node list according to an embodiment of the present disclosure;

DETAILED DESCRIPTION

Figure 3:
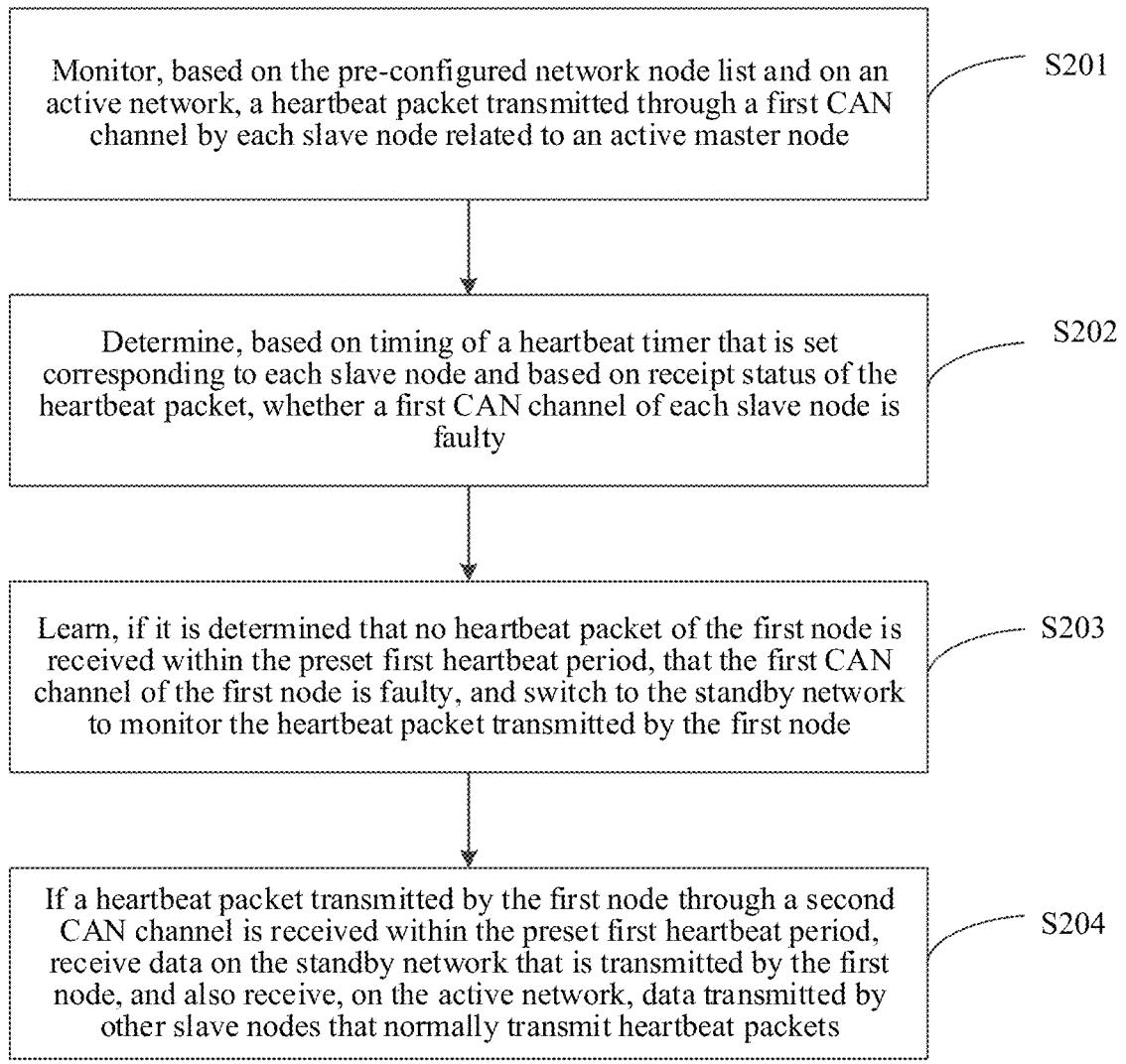
FIG. 3 is a flowchart of a CANopen-based train network data transmission method according to a first embodiment of the present disclosure.

The following describes embodiments of the present disclosure in detail. Examples of the embodiments are shown in the accompanying drawings, and same or similar reference signs in all the accompanying drawings indicate same or similar components or components having same or similar functions. The embodiments described below with reference to the accompanying drawings are exemplary, and are intended to explain the present disclosure and cannot be construed as a limitation to the present disclosure.

A train network node and a CANopen-based train network node monitoring method according to embodiments of the present disclosure are described below with reference to accompanying drawings.

Understandably, in related art, a monitoring mechanism based on heartbeat packets of a node is preferred for detecting heartbeat packets, in which a heartbeat packet transmitted by a related node is monitored, and when no heartbeat packet of one or more nodes is received in (predefined) several continuous heartbeat periods, it is determined that the one or more nodes have broken down on the network.

In other words, based on characteristics of the CANopen application protocol, each node on a network prefers a heartbeat packet-based monitoring mechanism to monitor node breakdowns. The heartbeat packet-based monitoring mechanism is a mechanism in which a heartbeat timer is set for each node, and a timeout value of the heartbeat timer is set to a heartbeat packet period. After a node goes live, each heartbeat timer counts down. The node parses a received heartbeat packet to obtain a corresponding node ID, and then matches the node ID with a node ID list in its own object dictionary, and resets the heartbeat timer corresponding to each matched node and starts over timing. If still no heartbeat packet is received from some nodes when the heartbeat timer times out, the node records that the heartbeat packets of such nodes have dropped. When no heartbeat packet is received from one or more nodes in (predefined) several continuous heartbeat periods, that is, when the recorded number of times of dropping the heartbeat packets add up to a specific value, it is determined that such nodes have broken down on the network.

However, as defined in existing CANopen specifications, heartbeat packet periods of all nodes shall be uniform so that each node can more conveniently check whether related nodes are online. If the heartbeat packet period varies between nodes, it is onerous for each node to check an offline. In addition, a heartbeat packet is only status data, for which a too short transmission period such as 50 ms shall be avoided according to specifications. A too short transmission period of the heartbeat packet increases a data volume of a communications network, and proliferation of network loads causes massive data conflicts (many pieces of data need to be transmitted at a moment, but only one piece of data is allowed to be transmitted on a single channel of any communications bus).

To resolve the foregoing problems, the present disclosure provides a CANopen-based train network node monitoring method. According to this method, after being powered on, a node automatically applies an appropriate node offline monitoring mechanism to nodes related to the node, thereby improving accuracy of a node detection result determined, helping improve redundancy effects of a train network, and ensuring sound operation of an entire train.

FIG. 1 is a flowchart of a CANopen-based train network node monitoring method according to an embodiment of the present disclosure. As shown in FIG. 1, the method includes the following steps.

S101. A train network node obtains an offline duration (or a breakdown duration) and a heartbeat packet transmission period based on a pre-configured network node list, where the offline duration is set on an offline timer (or a breakdown timer) corresponding to each node related to the network node, and the heartbeat packet transmission period is set on a heartbeat timer.

Understandably, an offline duration of the offline timer corresponding to each node related to the network node is preset, and is stored in a storage space corresponding to an object dictionary of the network node.

Specifically, based on a CANopen application protocol, the present disclosure requires that each node should create a list of all network nodes based on a topology view. The network node list means an object index in a custom CANopen object dictionary, where each node is identified by a unique node ID of the node. The object index is an object storage space that includes node IDs of all related nodes. In addition, what is bound to the node ID of each node also includes an offline timer and a heartbeat timer. That is, the architecture of a network node list in an embodiment of the present disclosure is shown in FIG. 2.

S102. Compare the offline duration that is set on the offline timer corresponding to each node with the heartbeat packet transmission period that is set on the heartbeat timer, and determine a offline monitoring mechanism of each node based on a comparison result.

Specifically, the present disclosure requires that, when each node is powered on, initialized and put into a pre-operation state, related offline timers and heartbeat timers of all nodes in the network node list should be compared so that the offline monitoring mechanism of each node is determined based on the comparison result.

More specifically, in a practical application, the offline monitoring mechanism of each node not only includes a heartbeat packet-based offline monitoring mechanism, but also includes another commonly used offline monitoring mechanism—a monitoring mechanism based on a process data object (PDO) inhibit time. When a heartbeat packet period is higher than a PDO transmission period of the node, an offline determining mechanism based on a PDO inhibit time is started for the node. For example, a heartbeat packet period currently defined for each node is 500 ms, but actually a PDO transmission period of a traction product is 50 ms. According to industrial specifications, if no PDO data of traction is received in continuous 250 ms (equivalent to 5 PDO transmission periods), a traction communication abnormity should be determined, and an emergency run mode shall be applied.

Based on the PDO inhibit time, one piece of PDO data is received and processed in a preset duration (a PDO inhibit time, which may be equal to a PDO transmission period), and if no corresponding PDO data is received in the preset duration, the node records a frame loss of the PDO packet. When an inhibit time timeout record exceeds a predefined value, it is determined that the node has broken down on the network.

The mechanism based on a PDO inhibit time means that, in an object index (1400 h to 15 FFh) related to a receive process data object (RPDO) in a CANopen object dictionary, a representative PDO is selected for each node separately based on an actual time limit requirement for determining an occurrence of offline (or breakdown), and then a PDO production counter is set for each node separately based on an inhibit time parameter in the PDO index. After going live, the node keeps detecting PDO transmission status of related nodes. If no PDO data is received in one inhibit time, the PDO production counter starts counting. When the count of the PDO production counter adds up to a preset value, it is determined that the node has broken down.

According to the design of this offline monitoring mechanism, the offline monitoring mechanism is based on a PDO inhibit time. However, if each node in the network uses the offline determining mechanism based on a PDO inhibit time, it is cumbersome to determine the offline of other nodes related to nodes of different PDO transmission periods which are 10 ms, 50 ms, 100 ms, 500 ms, and the like, because different offline timers need to be set based on characteristics of each node. Software has to be modified whenever a node is added, which leads to inconvenience of management.

Therefore, as analyzed above with respect to the heartbeat packet-based offline monitoring mechanism and the PDO packet-based offline monitoring mechanism, the two offline monitoring mechanisms have their own characteristics and limitations. To be specific, the existing designs of node offline monitoring mechanism consider few circumstances in which the offline monitoring mechanisms are ineffective. The node heartbeat packet-based monitoring mechanism alone or the PDO inhibit time monitoring mechanism alone is unable to accurately define all actual circumstances of node breakdowns, and is limited to some extent. In an embodiment of the present disclosure, characteristics of both the existing two kinds of offline monitoring mechanism based on the node heartbeat packet and the PDO inhibit time are integrated, an offline timer is set for each node, and specific judgment conditions are applied. In this way, after being powered on, a node automatically applies an appropriate node offline monitoring mechanism to nodes related to it.

Still referring to FIG. 2, the node ID of each node is bound to not only an offline timer and a heartbeat timer, but also a production counter.

Specifically, scenario 1:

In this scenario, a value of an offline timer of each node is greater than a value of a heartbeat timer of the node, a heartbeat packet-based monitoring mechanism is applied to other nodes related to the node, and a PDO production counter corresponding to the related nodes is set to 0. In this case, the foregoing mechanism based on a PDO inhibit time is not applicable to the node.

When no heartbeat packet is received in one heartbeat packet transmission period, the heartbeat timer is reset. When the timing of the heartbeat timer adds up to a preset period, it is determined that the related node has broken down or gone offline.

FIG. 3 is a flowchart of a CANopen-based train network data transmission method according to a first embodiment of the present disclosure. As shown in FIG. 3, the method includes the following steps.

S201. Monitor, based on a pre-configured network node list and on an active network, a heartbeat packet transmitted through a first CAN channel by each slave node related to an active master node.

Understandably, a network node list corresponding to the active master node is created in advance based on a network topology view. The network node list includes identifiers of slave nodes related to the active master node and heartbeat timers corresponding to the slave nodes, where the identifier of a slave node may be information that uniquely identifies the slave node, such as an identity (ID) of the slave node.

In addition, a network control instruction is transmitted from an active network and a standby network to all slave nodes, a first CAN channel and a second CAN channel of the slave nodes are controlled to get into a heartbeat packet operation mode, and a heartbeat timer corresponding to each slave node related to the active master node is started.

Specifically, after going live, the active master node performs a heartbeat packet-based monitoring mechanism. Based on a network topology view, the active master node may create a (configurable) list of all network nodes, that is, an object index in a custom CANopen object dictionary, where each node is identified by a unique node ID of the node. The object index is an object storage space that includes node identifiers (such as node IDs) of all nodes. The active master node sets a heartbeat timer for each node. After the active master node goes live, each heartbeat timer counts down. The active master node parses a received heartbeat packet to obtain a corresponding node identifier such as node ID, and then matches the node ID with a node list in its own object dictionary, and resets the heartbeat timer corresponding to each matched node and starts over timing. According to this characteristic requirement, all nodes including the active master node periodically transmit heartbeat packets at specific intervals in the name of their respective node IDs on the active network and the standby network at the same time.

In a practical application, in a default state, the active master node monitors heartbeat packet transmission status of each slave node on the active network first. To be specific, based on a pre-configured network node list, the active master node monitors, on the active network, a heartbeat packet transmitted through a first CAN channel by each slave node related to the active master node.

S202. Determine, based on timing of a heartbeat timer that is set corresponding to each slave node and based on receipt status of the heartbeat packet, whether a first CAN channel of each slave node is faulty.

Specifically, if the first CAN channel of the slave node is in proper communication, the active master node can normally receive the heartbeat packet from the slave node within a specified duration. Otherwise, the first CAN channel of the slave node is in faulty communication.

Certainly, in some circumstances, however, the active master node may fail in receiving the heartbeat packet from the slave node due to some other reasons, for example, due to abrupt interference caused to network signals. Therefore, in order to avoid misjudgment and accurately determine whether the first CAN channel of each slave is faulty, the timing of the heartbeat timer that is set corresponding to each slave node and the receipt status of the heartbeat packet are taken into overall consideration to determine whether the first CAN channel of each slave node is faulty.

For example, when no heartbeat packet of a node is detected in three heartbeat periods, the active master node first resets the node by using a reset instruction controlled by the network, and then keeps monitoring for two heartbeat periods. If the heartbeat packet of the node is received in the two heartbeat periods, the active master node keeps processing of this node on the active network. Otherwise, the first CAN channel of the slave node may be faulty.

Further, the timing of the heartbeat timer in the foregoing example is merely exemplary. Depending on specific application requirements, whether the first CAN channel of each slave node is faulty may also be determined according to the monitoring in a combination of other heartbeat periods. For example, when no heartbeat packet of a slave node is detected in five heartbeat periods, it is directly determined that the first CAN channel of the slave node is faulty.

S203. Determine, if it is determined that no heartbeat packet of the first node is received within a preset first heartbeat period, that the first CAN channel of the first node is faulty, and switch to the standby network to monitor the heartbeat packet transmitted by the first node.

The heartbeat packet transmitted by the first node and monitored on the standby network is transmitted by the first node through a second CAN channel, where the first node is any slave node related to the active master node.

Specifically, if no heartbeat packet of the first node is received in the preset first heartbeat period, it indicates that the failure by the active master node of receiving the heartbeat packet transmitted by the first node is caused by the fault of the first CAN channel. Therefore, to ensure the active master node to normally receive the data of the first node and maintain normal operation of an entire train, the active master node switches to the standby network to monitor the heartbeat packet transmitted by the first node through the second CAN channel.

Further, in this case, the active master node monitors the heartbeat packet of the first node on only the standby network, but still receives the heartbeat packet on the active network from other nodes whose first CAN channel is not faulty. Therefore, a node A needs to receive data from a node B and a node C. When the first CAN channel of the node B is faulty and the second CAN channel of the node C is faulty, according to the data transmission method of the present disclosure, the node A receives data from the node C over the active network, and receives data from the node B from the standby network. In this way, with the data being received from both the node B and the node C, normal functions of the node A are ensured, sound operation of the entire train is ensured, and redundancy effects are enhanced.

In another embodiment of the present disclosure, if the heartbeat packet of the first node is received within a preset period, it indicates that a data transmission fault of the node can be self-cured by resetting, and the data transmitted by the first node continues to be received from the active network.

S204. If a heartbeat packet transmitted by the first node through a second CAN channel is received within the preset first heartbeat period, receive data on the standby network that is transmitted by the first node, and also receive, on the active network, data transmitted by other slave nodes that normally transmit heartbeat packets.

Specifically, if the heartbeat packet transmitted by the first node through the second CAN channel is received within the preset first heartbeat period, it indicates that the second CAN channel functions normally. Therefore, the data transmitted by the first node needs to be received on the standby network.

Figure 4:
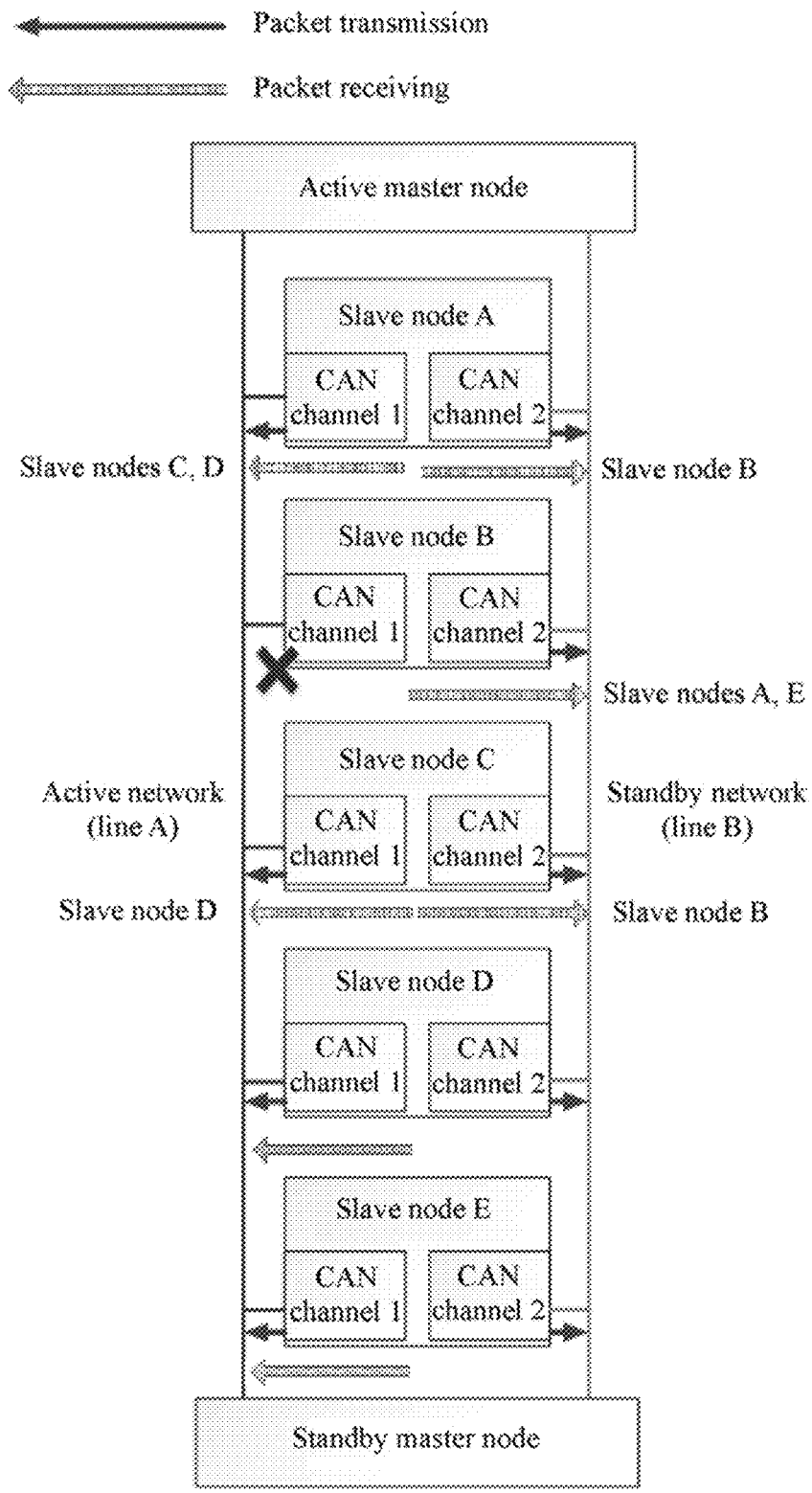
FIG. 4 is an exemplary topology view of a data transmission method of a redundant train network according to an embodiment of the present disclosure.

Therefore, according to the foregoing description of the CANopen-based train network data transmission method, with reference to the CAN redundancy design specified in the industrial specifications CIA302-6 and a mature fieldbus redundancy mechanism applied in the railway industry, a network architecture of the embodiment of the present disclosure should be established with reference to FIG. 4. As shown in FIG. 4, the slave node A receives the data transmitted by the slave nodes B and C, the slave node B receives the data transmitted by the slave nodes A and E, and the slave node C receives the data transmitted by the slave nodes B and D. Two active master nodes are set up in a network, one is a working active master node, and the other is a backup active master node. When the working active master node is faulty, the backup active master node works instead to undertake functions of the previous working active master node.

In addition, the nodes on all networks are connected by two CAN bus pairs: a line A and a line B. The line A is defined as an active network, and the line B is defined as a standby network. All nodes in operation transmit information to the line A and the line B line at the same time, but by default, receive information on only the line A. However, the nodes must be enabled to receive information on both the line A and the line B. In this way, when the first CAN channel of a slave node is faulty, data of this slave node will be received from the standby network, and the data transmitted by other slave nodes whose first CAN channel is not faulty will still be received from the active network. This ensures receipt of complete data of the related slave nodes and sound operation.

In the foregoing description of the embodiments of the present disclosure, it is defined by default that the active network and the standby network have no communication fault. In a practical application, however, the active network and the standby network may be both faulty. Therefore, after going live, the active master node also implements a bus fault determining mechanism.

Specifically, according to characteristic requirements of a CAN bus, all CAN controllers must include a transmission error counter and a receipt error counter. With reference to an error detection mechanism defined on a data link layer, when a bus communication abnormity is detected, the error counter will start counting. When the count of the error counter adds up to 255, the node gets into a bus-off state.

It is now required that the active master node should simultaneously monitor bus status of the active network and the standby network. When a bus of the active network of the active master node is faulty (for example, voltage of a CAN bus is abnormal, bus-off caused by too many frame errors, and the like), the active master node first parses the heartbeat packet of the backup active master node to decide whether to start the backup active master node. If the backup active master node can normally function as a working active master node, the active master node stops operating and gets into a silent state, and the standby node starts to act as a working active master node. If the backup active master node is currently in a fault state and incompetent to act as a working active master node, the current active master node keeps operating and immediately switches to the standby network to process all slave node data. At the same time, the active master node informs an instrument or another device that the active network is currently in a fault state. If the current standby network is also faulty, the communications network breaks down, and all nodes get into a special operation state of the train.

The count to 255 of the error counter is merely an example. Depending on different application requirements, when the count of the transmission error counter or the receipt error counter of the active master node adds up to any preset value that meets requirements, the active master node learns that the active network is faulty, and switches to the standby network to communicate with other nodes.

Figure 5:
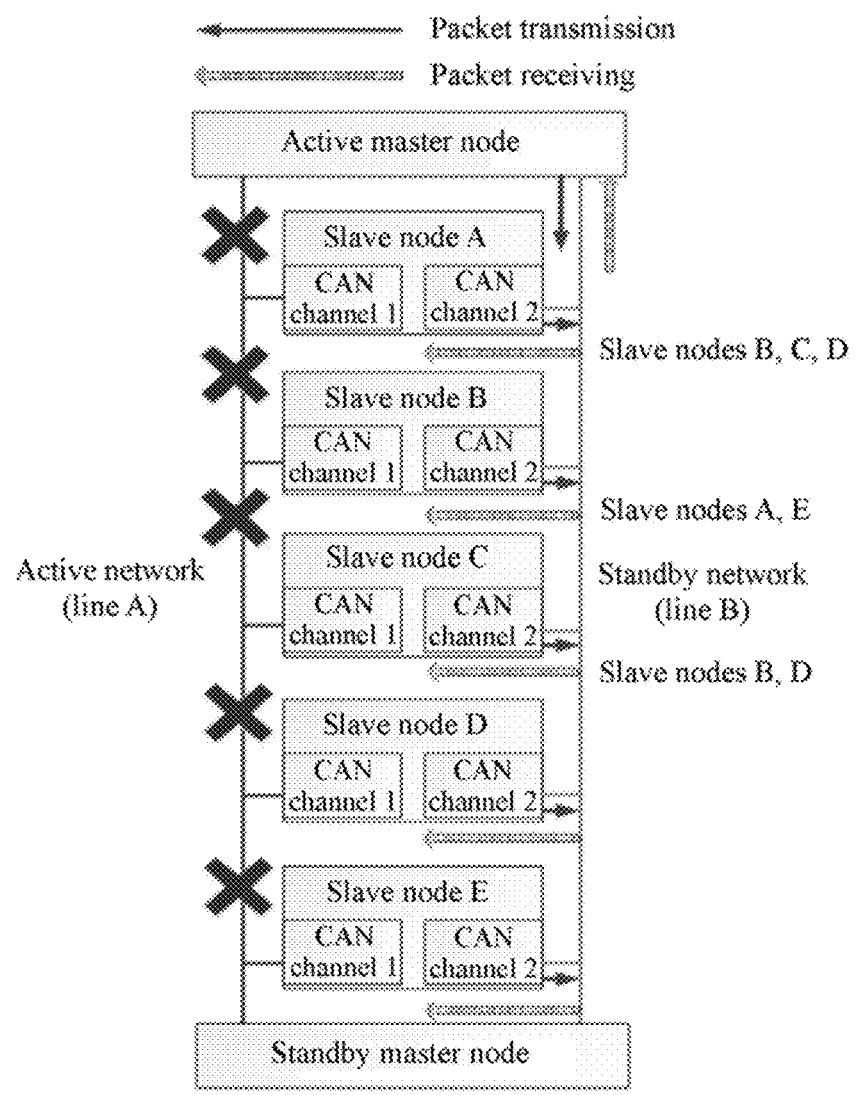
FIG. 5 is a schematic diagram of data receiving by each node in a case of a bus fault of an active network exemplified according to the present disclosure.

For example, as shown in FIG. 5, a bus of the active network has a short-circuit fault. In this case, all nodes on the active network are unable to communicate normally, and the error counter of each node keeps counting cumulatively. When each node determines that a channel of the active network gets into a bus-off state, the node switches to the standby network to receive desired data.

Further, based on the above description, in a practical application, the fault of the CAN channel may be not persistent, such as a suspension of operation caused by an abrupt change in a network speed. Therefore, to avoid waste of resources caused by unnecessary switching, in an embodiment of the present disclosure, a reset instruction is transmitted to the faulty CAN channel to determine, based on receipt status of the heartbeat packet transmitted after the resetting, whether a fault has actually occurred currently.

Specifically, in an embodiment of the present disclosure, after it is determined that no heartbeat packet of the first node is received within the preset first heartbeat period, instead of immediately determining that the first CAN channel is faulty, a reset instruction is transmitted to the first node from the active network so that the first CAN channel gets into an initial operation state.

Further, the heartbeat packet transmitted by the first node continues to be monitored on the active network. If no heartbeat packet of the first node is received in a preset second heartbeat period, it is determined that the first CAN channel of the first node is faulty, and services are switched to the standby network to monitor the heartbeat packet transmitted by the first node.

If the heartbeat packet of the first node is received in the preset second heartbeat period, it is determined that the fault of the first CAN channel of the first node is transient and has been removed by a reset operation. Therefore, the heartbeat packet transmitted by the first node needs to be monitored on the active network.

Based on the same principles, when the services are switched to the second CAN channel to receive the heartbeat packet transmitted by the first node, if no heartbeat packet transmitted by the first node through the second CAN channel is received in the preset first heartbeat period, instead of immediately determining that the second CAN channel has a communication fault, a reset instruction is transmitted to the first node from the standby network, and the heartbeat packet transmitted by the first node continues to be monitored on the standby network.

If the heartbeat packet transmitted by the first node through the second CAN channel is received within the preset second heartbeat period, it is determined that the fault of the second CAN channel of the first node is transient and has been removed by a reset operation. Therefore, the data transmitted by the first node needs to be received on the standby network, and the data transmitted by other slave nodes that normally transmit heartbeat packets needs to be received on the active network.

If no heartbeat packet transmitted by the first node through the second CAN channel is received in the preset second heartbeat period, it is determined that the second CAN channel of the first node is faulty.

According to the CANopen-based train network data transmission method provided in this embodiment of the present disclosure, the heartbeat packet transmitted through the first CAN channel by each slave node related to the active master node is monitored on the active network based on a pre-configured network node list, and whether the first CAN channel of each slave node is faulty is determined based on the timing of the heartbeat timer that is set corresponding to each slave node, and based on the receipt status of the heartbeat packet. In this way, if it is determined that no heartbeat packet of the first node is received within the preset first heartbeat period, then it is determined that the first CAN channel of the first node is faulty, and services are switched to the standby network to monitor the heartbeat packet transmitted by the first node through the second CAN channel. If a heartbeat packet transmitted by the first node through the second CAN channel is received within the preset first heartbeat period, the data transmitted by the first node needs to be received on the standby network, and at the same time, the data transmitted by other slave nodes other than the first node needs to be received on the active network. Therefore, when the active network of one or more slave nodes breaks down, services are switched to the standby network to receive the data of such slave nodes, and the data of other slave nodes is still received on the active network. This ensures complete receipt of the data of the related slave nodes and sound operation of the entire train, and improves redundancy effects of the train network.

Based on the foregoing embodiment, a CANopen-based train network data transmission method is provided in order to further improve stability and reusability of the CANopen-based train network data transmission method, display fault information of a current train network in real time based on data transmission status, facilitate a relevant operator to fix faults as soon as possible based on the fault information, and improve stability of data transmission of the train network.

Figure 6:
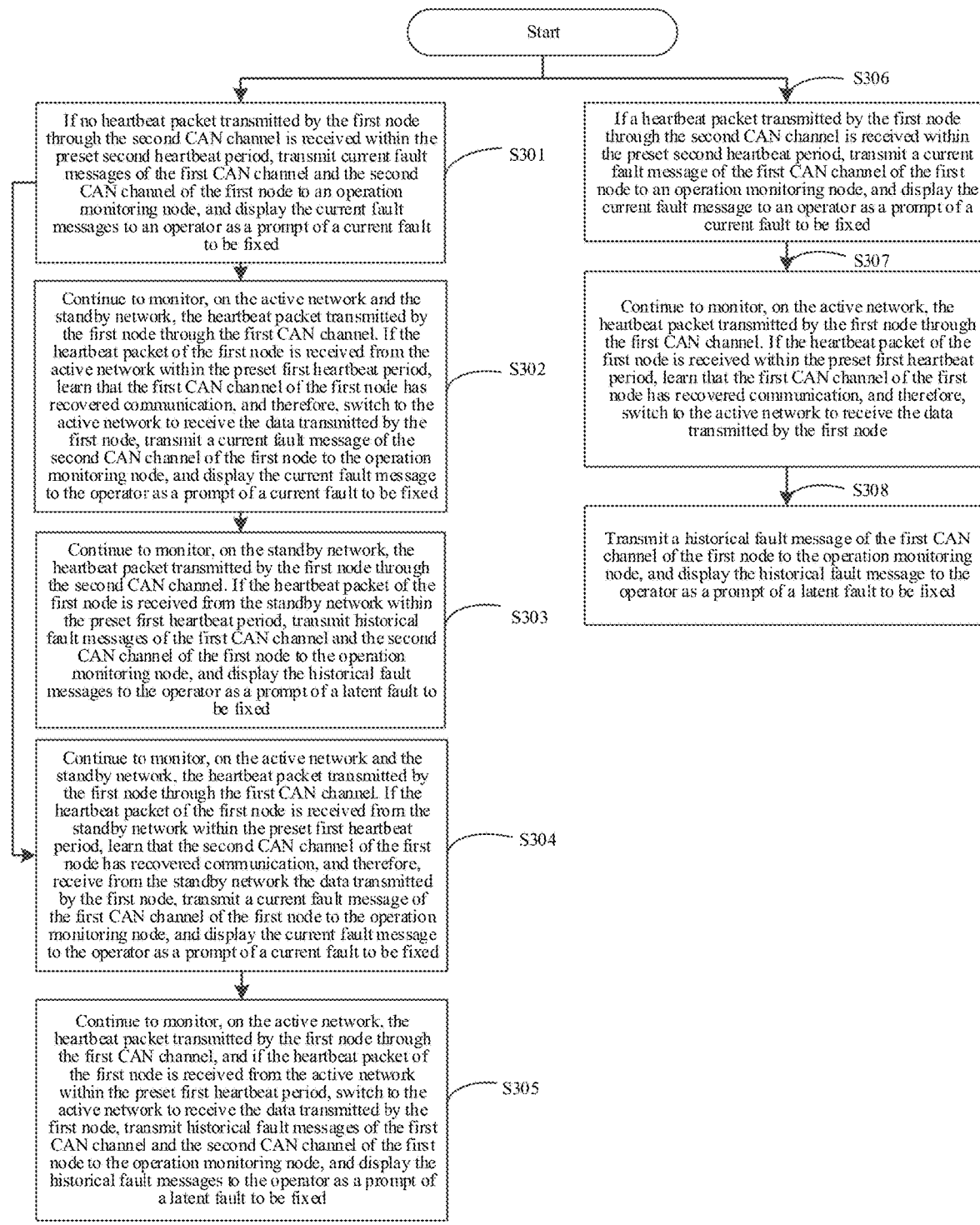
FIG. 6 is a flowchart of a CANopen-based train network data transmission method according to a second embodiment of the present disclosure.

FIG. 6 is a flowchart of a CANopen-based train network data transmission method according to a second embodiment of the present disclosure. As shown in FIG. 6, after step S204, the method further includes:

S301. If no heartbeat packet transmitted by the first node through the second CAN channel is received within the preset second heartbeat period, transmit current fault messages of the first CAN channel and the second CAN channel of the first node to an operation monitoring node, and display the current fault messages to an operator as a prompt of a current fault to be fixed.

Further, durations of the first heartbeat period and the second heartbeat period may be user-defined to meet requirements of business scenarios, and the first heartbeat period may be the same as or different from the second heartbeat period.

In addition, depending on specific application requirements, the monitoring node may be one of different apparatuses such as a display screen of an instrument or an application interface of a terminal device, which is not limited herein.

Specifically, if no heartbeat packet transmitted by the first node through the second CAN channel is received within the preset second heartbeat period, it indicates that the second CAN channel is also faulty. Therefore, in order for a relevant operator to determine the fault information and handle the fault in time, current fault messages of the first CAN channel and the second CAN channel of the first node is transmitted to the operation monitoring node, and displayed to the operator as a prompt of a current fault to be fixed.

In this example, the preset second heartbeat period is equal to five heartbeat periods, and the operation monitoring node is a display screen. Therefore, if still no heartbeat packet of the first node is detected on the standby network in five consecutive heartbeat periods, the active master node directly informs the display screen of an instrument that both the active network and the standby network of the first node are faulty (the fault type is a current fault), and gives a prompt of troubleshooting the active network and the standby network of the node.

S302. Continue to monitor, on the active network and the standby network, the heartbeat packet transmitted by the first node through the first CAN channel. If the heartbeat packet of the first node is received from the active network within the preset first heartbeat period, determine that the first CAN channel of the first node has recovered communication, and therefore, switch to the active network to receive the data transmitted by the first node, transmit a current fault message of the second CAN channel of the first node to the operation monitoring node, and display the current fault message to the operator as a prompt of a current fault to be fixed.

Specifically, when both lines of a node have a communication fault, the active master node needs to continue to monitor the heartbeat packet of the node on the active network and the standby network. If either the active network or the standby network of the faulty node recovers communication midway, the node performs communication by using the recovered network.

For example, the heartbeat packet transmitted by the first node through the first CAN channel continues to be monitored on the active network and the standby network. If either the active network or the standby network of the faulty node recovers communication midway, that is, the active master node receives a heartbeat packet of the first node on the active network in five consecutive heartbeat periods, the active master node receives and processes the data of the first node on the recovered network, but still informs the operation monitoring node (such as the display screen of an instrument) that this network of the first node has a historical fault and the other network of the first node has a current fault.

S303. Continue to monitor, on the standby network, the heartbeat packet transmitted by the first node through the second CAN channel. If the heartbeat packet of the first node is received from the standby network within the preset first heartbeat period, transmit historical fault messages of the first CAN channel and the second CAN channel of the first node to the operation monitoring node, and display the historical fault messages to the operator as a prompt of a latent fault to be fixed.

To fully recover the train network to improve its stability, the heartbeat packet transmitted by the first node through the second CAN channel continues to be monitored on the standby network. For example, if both the active network and the standby network of the faulty node have recovered communication midway, the active master node only needs to process the data of the related slave node on the active network, but still informs the operation monitoring node (such as the display screen of an instrument) that both the active network and the standby network of the first node have a historical fault, thereby facilitating the relevant operator to eliminate safety hazards and improving safety stability of the train network.

S304. Continue to monitor, on the active network and the standby network, the heartbeat packet transmitted by the first node through the first CAN channel. If the heartbeat packet of the first node is received from the standby network within the preset first heartbeat period, determine that the second CAN channel of the first node has recovered communication, and therefore, receive from the standby network the data transmitted by the first node, transmit a current fault message of the first CAN channel of the first node to the operation monitoring node, and display the current fault message to the operator as a prompt of a current fault to be fixed.

Specifically, if the second CAN channel recovers communication earlier than the first CAN channel, the active master node receives from the standby network the data transmitted by the first node, transmits a current fault message of the first CAN channel of the first node to the operation monitoring node, and displays the current fault message to the operator as a prompt of a current fault to be fixed.

S305. Continue to monitor, on the active network, the heartbeat packet transmitted by the first node through the first CAN channel, and if the heartbeat packet of the first node is received from the active network within the preset first heartbeat period, switch to the active network to receive the data transmitted by the first node, transmit historical fault messages of the first CAN channel and the second CAN channel of the first node to the operation monitoring node, and display the historical fault messages to the operator as a prompt of a latent fault to be fixed.

Specifically, when receiving over the standby network the data transmitted through the second CAN channel, the active master node determines, based on the preset first heartbeat period and the receipt status of the heartbeat packet, whether the first CAN channel of the first node recovers communication. If the communication is recovered, the active master node switches to the active network to receive the data transmitted by the first node, transmits historical fault messages of the first CAN channel and the second CAN channel of the first node to the operation monitoring node, and displays the historical fault messages to the operator as a prompt of a latent fault to be fixed.

S306. If a heartbeat packet transmitted by the first node through the second CAN channel is received within the preset second heartbeat period, transmit a current fault message of the first CAN channel of the first node to the operation monitoring node, and display the current fault message to an operator as a prompt of a current fault to be fixed.

Specifically, if a heartbeat packet transmitted by the first node through the second CAN channel is received within the preset second heartbeat period, it indicates that the second CAN channel provides data services normally. Therefore, the active master node receives and processes the related data of the node on the standby network, and still receives and processes the data of other nodes on the active network. At the same time, the active master node informs the operation monitoring node (such as the display screen of an instrument) that the first CAN channel of the first node is faulty (the fault type is a current fault), and gives a prompt of troubleshooting the active network of the first node.

S307. Continue to monitor, on the active network, the heartbeat packet transmitted by the first node through the first CAN channel, and if the heartbeat packet of the first node is received within the preset first heartbeat period, determine that the first CAN channel of the first node has recovered communication, and switch to the active network to receive the data transmitted by the first node.

S308. Transmit a historical fault message of the first CAN channel of the first node to the operation monitoring node, and display the historical fault message to the operator as a prompt of a latent fault to be fixed.

Specifically, after prompting the relevant operator to troubleshoot the active network of the first node, the active master node continues to monitor, on the active network, the heartbeat packet transmitted by the first node through the first CAN channel. If the faulty active network of the first node recovers communication midway, for example, if the active master node successfully receives the heartbeat packet of the first node on the active network for five consecutive heartbeat periods, the active master node switches back to the active network to receive the data of the first node, stops the processing on the standby network, but still informs the operation monitoring node (such as the display screen of an instrument) that the active network of the first node is faulty (the fault type is a historical fault), and also gives a prompt of troubleshooting the active network of the first node and checking for latent faults.

Accordingly, the CANopen-based train network data transmission method provided in this embodiment of the present disclosure selects the active network or the standby network based on real-time status of the train network, and displays corresponding information on the monitoring node as a prompt to the relevant operator, thereby improving stability and reusability of the train network data transmission method.

Scenario 2:

In this scenario, if a comparison is performed to determine that a offline duration of the node related to the network node is less than or equal to a heartbeat packet transmission period, a PDO packet-based inhibit time mechanism is started to determine an offline, and based on the offline duration and an inhibit time of a PDO packet of the related node, a threshold is set in a PDO production counter corresponding to the related node. The threshold is an appropriate value automatically calculated by the node based on a preset value of an offline timer and a PDO inhibit time of some nodes, and assigned to the PDO production counter.

Further, when no PDO packet is received within an inhibit time, the PDO production counter starts counting. When the count of the PDO production counter adds up to a threshold, it is determined that the related node has broken down.

Figure 7:
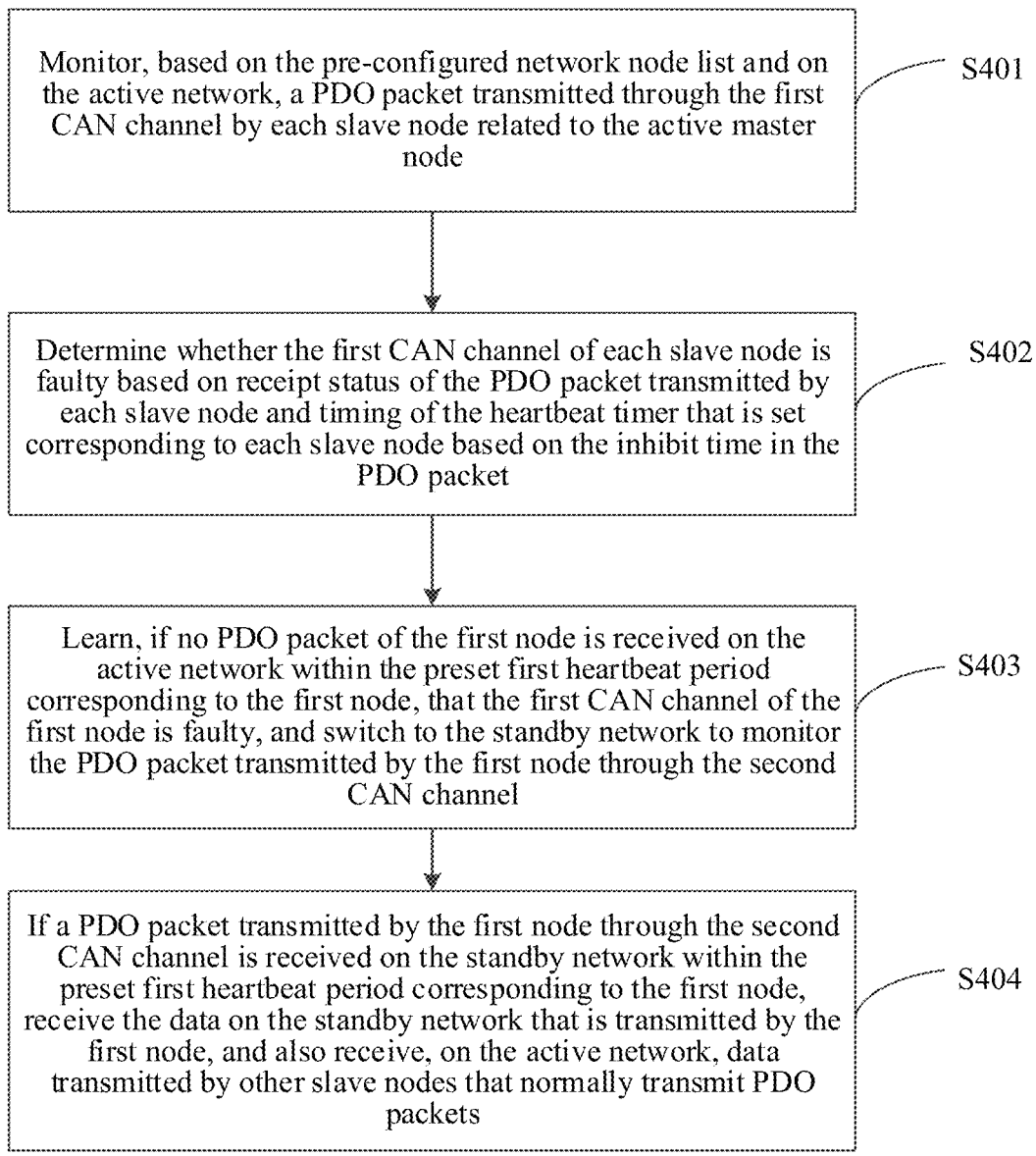
FIG. 7 is a flowchart of a CANopen-based train network data transmission method according to a third embodiment of the present disclosure.

FIG. 7 is a flowchart of a CANopen-based train network data transmission method according to a third embodiment of the present disclosure. As shown in FIG. 7, the method includes the following steps.

S401. Monitor, based on the pre-configured network node list and on the active network, a PDO packet transmitted through the first CAN channel by each slave node related to the active master node.

A process data object (PDO) is used to transmit real-time data. It provides a direct access channel to a device application object, and is used to transmit a real-time short-frame data and has a relatively high priority.

In a PDO packet monitoring mechanism, an inhibit time about a communication parameter index in a PDO object dictionary is used as a key condition for determining whether a node has broken down. A PDO communication parameter structure is shown in Table 1 below.

TABLE 1

| Index | Subindex | Description | Data type |
|---|---|---|---|
| RPDO: 1400h to 15FFh | 00h | Count | Unsigned 8 |
| | 01h | CAN-ID: ID that receives this PDO frame | Unsigned 32 |
| | 02h | Transmission type:<br>00h: Non-cyclic synchronization<br>01h: Cyclic synchronization<br>FCh: Remote synchronization<br>FEh: Asynchronization, manufacturer-specific event | Unsigned 8 |

TABLE 1-continued

| Index | Subindex | Description | Data type |
|---|---|---|---|
| | | FFh: Abnormity, device subprotocol-specific event | Unsigned 16 |
| | 03h | Inhibit time (1/10 ms) | Unsigned 16 |
| | 04h | Reserved | Reserved |
| | 05h | Time to trigger an event timer (ms) | Unsigned 16 |
| | 06h | Synchronization start value | Unsigned 8 |

Understandably, the present disclosure requires that the master node should create a (configurable) list of all network nodes based on a topology view. The network node list includes identifiers of all slave nodes related to the active master node and heartbeat timers corresponding to the slave nodes. A heartbeat timer corresponding to each slave node is set based on an inhibit time in a PDO packet. A network control instruction is transmitted to all slave nodes simultaneously from the active network and the standby network, so that the first CAN channel and the second CAN channel of the slave nodes are controlled to enter a PDO packet operation mode. In addition, the heartbeat timer corresponding to each slave node related to the active master node is started.

To be specific, in an RPDO object index (1400 h to 15 FFh) in a CANopen object dictionary, a representative PDO is selected for each node based on an actual time limit requirement for determining an offline, and then a heartbeat counter is set for each node based on the inhibit time parameter in the PDO indexes.

Further, after going live, the master node keeps detecting PDO transmission status of each node. The active network works by default, and therefore, a PDO packet transmitted through a first CAN channel by each slave node related to the active master node needs to be monitored on the active network based on a pre-configured network node list. In this way, based on receipt status of the packet, it can be determined whether each slave node has broken down.

S402. Determine whether the first CAN channel of each slave node is faulty based on receipt status of the PDO packet transmitted by each slave node and timing of the heartbeat timer that is set corresponding to each slave node based on the inhibit time in the PDO packet.

Understandably, still referring to Table 1, in the PDO packet transmission mechanism, the subindex 03 h inhibit time is understood in this way: A piece of PDO data is received and processed within a preset duration; if no corresponding PDO data is received within the preset duration, the node records a frame loss of the PDO packet; if no PDO data is received within an inhibit time, the heartbeat counter starts counting; when the count of the heartbeat counter adds up to a preset value, the master node determines that the node has broken down. Therefore, in this embodiment of the present disclosure, the timing of the heartbeat timer is set with reference to the inhibit time. Therefore, based on the receipt status of the PDO packet transmitted by each slave node and the inhibit time in the PDO packet, the timing of the heartbeat timer is set corresponding to each slave node, and it is determined whether the first CAN channel of each slave node is faulty.

If the first CAN channel of the slave node is in proper communication, the master node can normally receive the PDO packet from the slave node within a specified duration. Otherwise, the first CAN channel of the slave node is in faulty communication.

S403. Determine, if no PDO packet of the first node is received on the active network within the preset first heartbeat period corresponding to the first node, that the first CAN channel of the first node is faulty, and switch to the standby network to monitor the PDO packet transmitted by the first node through the second CAN channel.

The first node is any slave node related to the active master node.

Specifically, if no PDO packet of the first node is received on the active network within the preset first heartbeat period corresponding to the first node, it indicates that the failure by the active master node of receiving the PDO packet transmitted by the first node is caused by the fault of the first CAN channel. Therefore, to ensure the active master node to normally receive the PDO packet of the first node and maintain normal operation of the entire train, services are switched to the standby network to monitor the PDO packet transmitted by the first node through the second CAN channel.

Further, in this case, the active master node may monitor the PDO packet of the first node on only the standby network, but still receives the PDO packet on the active network from slave nodes whose first CAN channel is not faulty. Therefore, a node A needs to receive data from a node B and a node C. When the first CAN channel of the node B is faulty and the second CAN channel of the node C is faulty, according to the data transmission method of the present disclosure, the node A receives data from the node C over the active network, and receives data from the node B over the standby network. In this way, with the data being received from both the node B and the node C, normal functions of the node A are ensured, sound operation of the entire train is ensured, and redundancy effects are enhanced.

In another embodiment of the present disclosure, if the PDO packet of the first node is received within a preset first heartbeat period, it indicates that a data transmission fault of the slave node can be self-cured by resetting, and the data transmitted by the first node continues to be received from the active network.

S404. If a PDO packet transmitted by the first node through the second CAN channel is received on the standby network within the preset first heartbeat period corresponding to the first node, receive the data on the standby network that is transmitted by the first node, and also receive, on the active network, data transmitted by other slave nodes that normally transmit PDO packets.

Specifically, if a PDO packet transmitted by the first node through the second CAN channel is received within the first heartbeat period corresponding to the first node, it indicates that the second CAN channel functions normally. Therefore, the data transmitted by the first node needs to be received on the standby network, and at the same time, the data transmitted by other slave nodes that normally transmit PDO packets needs to be received on the active network.

Therefore, according to the foregoing description of the CANopen-based train network data transmission method, with reference to the CAN redundancy design specified in the industrial specifications CIA302-6 and a mature fieldbus redundancy mechanism applied in the railway industry, a network architecture of the embodiment of the present disclosure should be established with reference to FIG. 4, where two master nodes are set up in a network, one is an active master node, and the other is a standby master node. When the active master node is faulty, the standby master node works instead to undertake functions of the previous active master node.

To be specific, in an embodiment of the present disclosure, if the active master node is detected as faulty, services are switched to the standby master node to exchange data with other related slave nodes.

In addition, the nodes on all networks are connected by two CAN bus pairs: a line A and a line B. The line A is defined as an active network, and the line B is defined as a standby network. All nodes in operation transmit information to the line A and the line B line at the same time, but by default, receive information on only the line A. However, the nodes must be enabled to receive information on both the line A and the line B. In this way, when the first CAN channel of a slave node is faulty, data of this slave node will be received from the standby network, and the data transmitted by other slave nodes whose first CAN channel is not faulty will still be received from the active network. This ensures receipt of complete data of the related slave nodes and sound operation.

In the foregoing description of the embodiments of the present disclosure, it is defined by default that the active network and the standby network have no communication fault. In a practical application, however, the active network and the standby network may be both faulty. Therefore, after going live, the active master node also implements a bus fault determining mechanism.

Specifically, according to characteristic requirements of a CAN bus, all CAN controllers must include a transmission error counter and a receipt error counter. With reference to an error detection mechanism defined on a data link layer, when a bus communication abnormality is detected, the error counter will start counting. When the count of the error counter adds up to 255, the node gets into a bus-off state. To be specific, if the count of a transmission error counter or a receipt error counter in the active master node adds up to a preset value, it is determined that the active network is faulty, and services are switched to the standby network to communicate with other nodes.

It is now required that the active master node should simultaneously monitor bus status of the active network and the standby network. When a bus of the active network of the active master node is faulty (for example, voltage of a CAN bus is abnormal, bus-off caused by too many frame errors, and the like), the active master node first parses the packet of the standby master node to decide whether to start the standby master node. If the standby master node can normally function as a working active master node, the active master node stops operating and gets into a silent state, and the standby master node starts to act as a working active master node. If the standby master node is currently in a fault state and incompetent to act as a working active master node, the current active master node keeps operating and immediately switches to the standby network to process all slave node data. At the same time, the active master node informs an instrument or another device that the active network is currently in a fault state. If the current standby network is also faulty, the communications network breaks down, and all nodes get into a special operation state of the train.

The count to 255 of the error counter is merely an example. Depending on different application requirements, when the count of the transmission error counter or the receipt error counter of the active master node adds up to any preset value that meets requirements, the active master node learns that the active network is faulty, and switches to the standby network to communicate with other nodes.

For example, as shown in FIG. 5, a bus of the active network has a short-circuit fault. In this case, all nodes on the active network are unable to communicate normally, and the error counter of each node keeps counting cumulatively. When each node determines that a channel of the active network gets into a bus-off state, the node switches to the standby network to receive desired data.

Further, based on the above description, in a practical application, the fault of the CAN channel may be not persistent, such as a suspension of operation caused by an abrupt change in a network speed. Therefore, to avoid waste of resources caused by unnecessary switching, in an embodiment of the present disclosure, a reset instruction is transmitted to the faulty CAN channel to determine, based on receipt status of the PDO packet transmitted after the resetting, whether a fault has actually occurred currently.

Specifically, in an embodiment of the present disclosure, after it is determined that no PDO packet of the first node is received within the preset first heartbeat period, instead of immediately determining that the first CAN channel is faulty, a reset instruction is transmitted to the first node from the active network so that the first CAN channel gets into an initial operation state.

Further, the PDO packet transmitted by the first node continues to be monitored on the active network. If no PDO packet of the first node is received in a preset second heartbeat period corresponding to the first node, it is determined that the first CAN channel of the first node is faulty, and services are switched to the standby network to monitor the PDO packet transmitted by the first node.

If the PDO packet of the first node is received in the preset second heartbeat period, it is determined that the fault of the first CAN channel of the first node is transient and has been removed by a reset operation. Therefore, the PDO packet transmitted by the first node needs to be monitored on the active network.

Based on the same principles, when services are switched to the second CAN channel to receive the PDO packet transmitted by the first node, if no PDO packet transmitted by the first node through the second CAN channel is received in the preset first heartbeat period corresponding to the first node, instead of immediately determining that the second CAN channel has a communication fault, a reset instruction is transmitted to the first node from the standby network, and the PDO packet transmitted by the first node continues to be monitored on the standby network.

If the PDO packet transmitted by the first node through the second CAN channel is received within the second heartbeat period corresponding to the first node, it is determined that the fault of the second CAN channel of the first node is transient and has been removed by a reset operation. Therefore, the data transmitted by the first node needs to be received on the standby network, and the data transmitted by other slave nodes that normally transmit PDO packets needs to be received on the active network.

If no PDO packet transmitted by the first node through the second CAN channel is received in the second heartbeat period corresponding to the first node, it is determined that the second CAN channel of the first node is faulty.

Further, durations of the first heartbeat period and the second heartbeat period may be user-defined to meet requirements of business scenarios, and the first heartbeat period may be the same as or different from the second heartbeat period.

According to the CANopen-based train network data transmission method provided in this embodiment of the present disclosure, the PDO packet transmitted through the first CAN channel by each slave node related to the active master node is monitored on the active network based on a pre-configured network node list, and whether the first CAN channel of each slave node is faulty is determined based on the receipt status of the PDO packet transmitted by each slave node, and based on the timing of the heartbeat timer that is set corresponding to each slave node in light of the inhibit time in the PDO packet. If it is determined that no PDO packet of the first node is received on the active network within the preset first heartbeat period corresponding to the first node, then it is determined that the first CAN channel of the first node is faulty, and services are switched to the standby network to monitor the PDO packet transmitted by the first node through the second CAN channel. If a PDO packet transmitted by the first node through the second CAN channel is received on the standby network within the preset first heartbeat period corresponding to the first node, the data transmitted by the first node needs to be received on the standby network, and at the same time, the data transmitted by other slave nodes that normally transmit PDO packets needs to be received on the active network. Therefore, when the active network of one or more slave nodes breaks down, services are switched to the standby network to receive the data of such slave nodes, and the data of other slave nodes is still received on the active network. This ensures complete receipt of the data of the related slave nodes and sound operation of the entire train, and improves redundancy effects of the train network.

Based on the foregoing embodiment, a CANopen-based train network data transmission method is provided in order to further improve stability and reusability of the CANopen-based train network data transmission method, display fault information of a current train network in real time based on data transmission status, facilitate a relevant operator to fix faults as soon as possible based on the fault information, and improve stability of data transmission of the train network.

Figure 8:
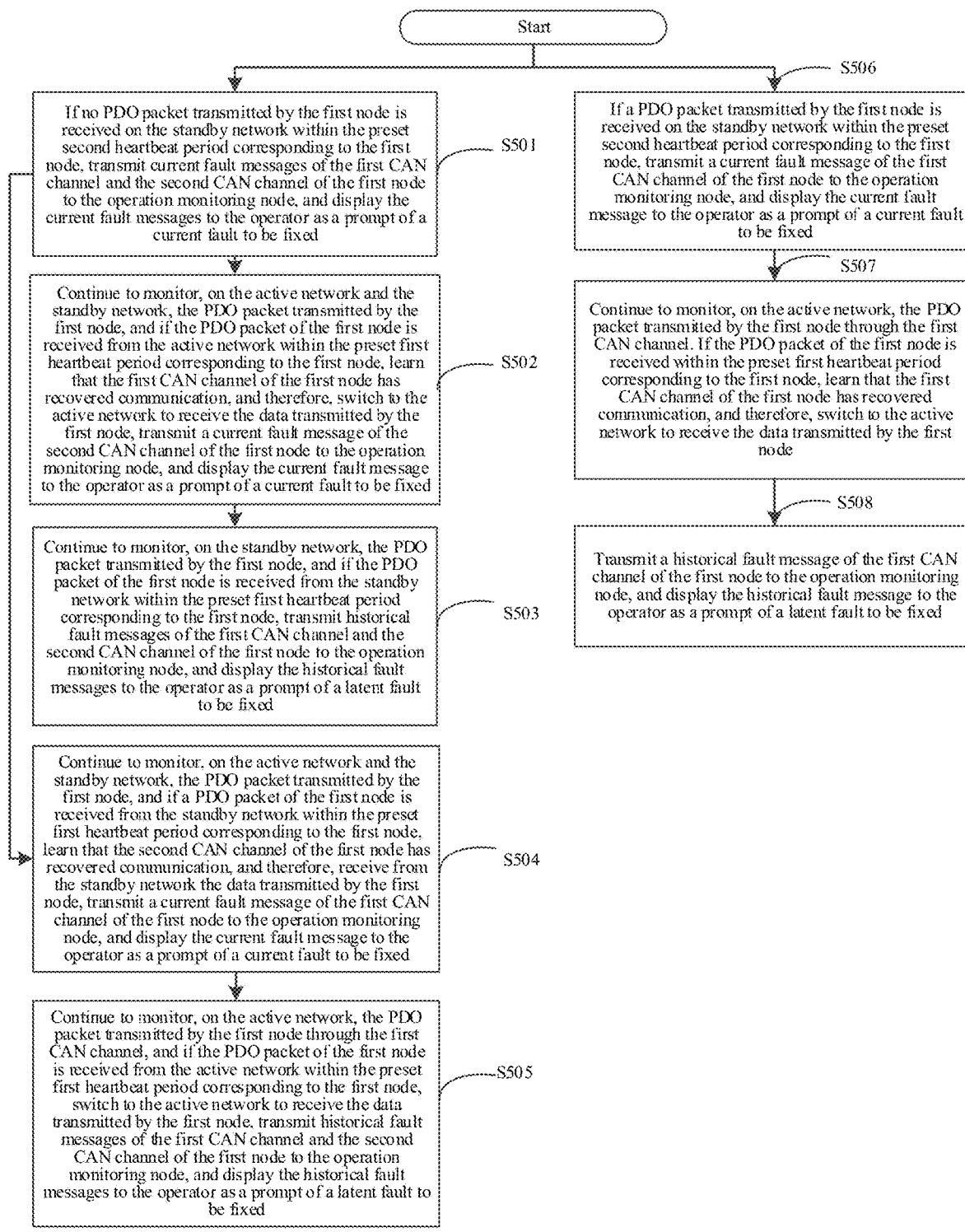
FIG. 8 is a flowchart of a CANopen-based train network data transmission method according to a fourth embodiment of the present disclosure.

FIG. 8 is a flowchart of a CANopen-based train network data transmission method according to a fourth embodiment of the present disclosure. As shown in FIG. 8, after step S404, the method further includes:

S501. If no PDO packet transmitted by the first node is received on the standby network within the preset second heartbeat period corresponding to the first node, transmit current fault messages of the first CAN channel and the second CAN channel of the first node to the operation monitoring node, and display the current fault messages to the operator as a prompt of a current fault to be fixed.

Data transmitted by slave nodes that work normally can be received within the second heartbeat period. In addition, depending on specific application requirements, the monitoring node may be one of different apparatuses such as a display screen of an instrument or an application interface of a terminal device, which is not limited herein.

Specifically, if no PDO packet transmitted by the first node through the second CAN channel is received within the preset second heartbeat period, it indicates that the second CAN channel is also faulty. Therefore, in order for a relevant operator to determine the fault information and handle the fault in time, current fault messages of the first CAN channel and the second CAN channel of the first node is transmitted to the operation monitoring node, and displayed to the operator as a prompt of a current fault to be fixed.

In this example, the preset second heartbeat period is equal to a (a is a positive integer) heartbeat periods, and the operation monitoring node is a display screen. Therefore, if still no PDO packet of the first node is detected on the standby network in a heartbeat period, an active master node directly informs the display screen of an instrument that both the active network and the standby network of the first node are faulty (the fault type is a current fault), and gives a prompt of troubleshooting the active network and the standby network of the node.

S502. Continue to monitor, on the active network and the standby network, the PDO packet transmitted by the first node, and if the PDO packet of the first node is received from the active network within the preset first heartbeat period corresponding to the first node, determine that the first CAN channel of the first node has recovered communication, and therefore, switch to the active network to receive the data transmitted by the first node, transmit a current fault message of the second CAN channel of the first node to the operation monitoring node, and display the current fault message to the operator as a prompt of a current fault to be fixed.

Specifically, when both lines of a node have a communication fault, the active master node needs to continue to monitor the data transmitted by the node on the active network and the standby network. If either the active network or the standby network of the faulty node recovers communication midway, the node performs communication by using the recovered network.

For example, the PDO packet transmitted by the first node through the first CAN channel continues to be monitored on the active network and the standby network. If either the active network or the standby network of the faulty node recovers communication midway, that is, the master node receives a PDO packet of the first node on the active network in a (a is a positive integer) heartbeat periods, the master node receives and processes the data of the first node on the recovered network, but still informs the operation monitoring node (such as the display screen of an instrument) that this network of the first node has a historical fault and the other network of the first node has a current fault.

S503. Continue to monitor, on the standby network, the PDO packet transmitted by the first node, and if the PDO packet of the first node is received from the standby network within the preset first heartbeat period corresponding to the first node, transmit historical fault messages of the first CAN channel and the second CAN channel of the first node to the operation monitoring node, and display the historical fault messages to the operator as a prompt of a latent fault to be fixed.

To fully recover the train network to improve its stability, the PDO packet transmitted by the first node through the second CAN channel continues to be monitored on the standby network. For example, if both the active network and the standby network of the faulty node have recovered communication midway, the active master node only needs to process the data of the related slave node on the active network, but still informs the operation monitoring node (such as the display screen of an instrument) that both the active network and the standby network of the first node have a historical fault, thereby facilitating the relevant operator to eliminate safety hazards and improving safety stability of the train network.

S504. Continue to monitor, on the active network and the standby network, the PDO packet transmitted by the first node, and if a PDO packet of the first node is received from the standby network within the preset first heartbeat period corresponding to the first node, determine that the second CAN channel of the first node has recovered communication, and therefore, receive from the standby network the data transmitted by the first node, transmit a current fault message of the first CAN channel of the first node to the operation monitoring node, and display the current fault message to the operator as a prompt of a current fault to be fixed.

Specifically, if the second CAN channel recovers communication earlier than the first CAN channel, the active master node receives from the standby network the data transmitted by the first node, transmits a current fault message of the first CAN channel of the first node to the operation monitoring node, and displays the current fault message to the operator as a prompt of a current fault to be fixed.

S505. Continue to monitor, on the active network, the PDO packet transmitted by the first node through the first CAN channel, and if the PDO packet of the first node is received from the active network within the preset first heartbeat period corresponding to the first node, switch to the active network to receive the data transmitted by the first node, transmit historical fault messages of the first CAN channel and the second CAN channel of the first node to the operation monitoring node, and display the historical fault messages to the operator as a prompt of a latent fault to be fixed.

Specifically, when receiving over the standby network the data transmitted through the second CAN channel, the active master node determines, based on the receipt status of the PDO packet, whether the first CAN channel of the first node recovers communication. If the communication is recovered, the active master node switches to the active network to receive the data transmitted by the first node, transmits historical fault messages of the first CAN channel and the second CAN channel of the first node to the operation monitoring node, and displays the historical fault messages to the operator as a prompt of a latent fault to be fixed.

S506. If a PDO packet transmitted by the first node is received on the standby network within the preset second heartbeat period corresponding to the first node, transmit a current fault message of the first CAN channel of the first node to the operation monitoring node, and display the current fault message to the operator as a prompt of a current fault to be fixed.

Specifically, if a PDO packet transmitted by the first node through the second CAN channel is received within the preset second heartbeat period, it indicates that the second CAN channel provides data services normally. Therefore, the master node receives and processes the related data of the node on the standby network, and still receives and processes the data of other nodes on the active network. At the same time, the master node informs the operation monitoring node (such as the display screen of an instrument) that the first CAN channel of the first node is faulty (the fault type is a current fault), and gives a prompt of troubleshooting the active network of the first node.

S507. Continue to monitor, on the active network, the PDO packet transmitted by the first node through the first CAN channel, and if the PDO packet of the first node is received within the preset first heartbeat period corresponding to the first node, determine that the first CAN channel of the first node has recovered communication, and switch to the active network to receive the data transmitted by the first node.

S508. Transmit a historical fault message of the first CAN channel of the first node to the operation monitoring node, and display the historical fault message to the operator as a prompt of a latent fault to be fixed.

Specifically, after prompting the relevant operator to troubleshoot the active network of the first node, the active master node continues to monitor, on the active network, the PDO packet transmitted by the first node through the first CAN channel. If the faulty active network of the first node recovers communication midway, for example, if the master node successfully receives the PDO packet of the first node on the active network in a (a is a positive integer) heartbeat periods, the master node switches back to the active network to receive the data of the first node, stops the processing on the standby network, but still informs the operation monitoring node (such as the display screen of an instrument) that the active network of the first node is faulty (the fault type is a historical fault), and also gives a prompt of troubleshooting the active network of the first node and checking for latent faults.

Accordingly, the CANopen-based train network data transmission method provided in this embodiment of the present disclosure selects the active network or the standby network based on real-time status of the train network, and displays corresponding information on the monitoring node as a prompt to the relevant operator, thereby improving stability and reusability of the train network data transmission method.

To further improve flexibility of the CANopen-based train network node monitoring method provided in the embodiments of the present disclosure, in an embodiment of the present disclosure, a list of all network nodes that is created by each node in light of a topology view is configurable, and an offline timer that is set up for all related nodes is user-definable in light of characteristics of each node, where the offline timer specifies an actual duration that is used for determining an offline of a node. When a node is added or removed on the train network, a network node list that is related to the changed node and a corresponding offline timer need to be reconfigured to start or stop monitoring an offline of the changed node.

In order for a person skilled in the art to better understand the CANopen-based train network node monitoring method provided in the present disclosure, the following uses an example to describe the method applied in a specific scenario.

In this example, there are five nodes in a network: one active master node and four slave nodes A, B, C, and D. The master node is defined to monitor operating status of four slave nodes in real time, that is, needs to check whether the four slave nodes have broken down.

Based on a network communication data volume, it is decided that a heartbeat packet transmission period of all nodes including the master node is 500 ms. With respect to the setting of conditions for determining an offline of each node, each offline duration of the master node and the slave nodes A, B, and C is 5 s, indicating that a node is deemed having broken down if no data of the node is received within 5 s. The slave node D is special in that, if no data of the slave node D is received within 300 ms, related nodes such as the master node determine that the slave node D has broken down.

A PDO packet transmission period is 100 ms for PDO packets transmitted by the master node, 1000 ms for PDO packets transmitted by the slave node A, 50 ms for PDO packets transmitted by the slave node B, 100 ms for PDO packets transmitted by the slave node C, and 50 ms for PDO packets transmitted by the slave node D.

Based on the foregoing settings, after being powered on and initialized, the master node compares a time value of an offline timer of the slave nodes A, B, C, and D in a network node list with a time value of a heartbeat timer of the nodes separately. The value of the offline timer of the slave nodes A, B, and C is 5 s, the value of the offline timer of the slave node D is 300 ms, and the values that are set on the heartbeat timers of the slave nodes A, B, C, and D are all 500 ms. Because the values of the offline timers of the slave nodes A, B, and C are larger than the values of their heartbeat timers, the master node applies a heartbeat packet-based monitoring mechanism to the three slave nodes. Because the value of the offline timer of the slave node D is smaller than the value of its heartbeat timer, the master node applies a PDO inhibit time mechanism to the slave node D. The PDO packet transmission period of the slave node D is 50 ms, and it takes 50 ms for the master node to receive and process data of the slave node D. Therefore, the master node set a PDO inhibit time of the slave node D to 50 ms. As calculated according to the value of the offline timer and the value of the inhibit time, the value of a production counter is 6. Specifically, if no PDO data is received within an inhibit time, the PDO production counter starts counting. When the count of the PDO production counter adds up to 6, it is determined that the slave node D has broken down.

In this way, in this embodiment of the present disclosure, an algorithm that integrates existing two offline monitoring mechanisms is provided in light of characteristics of both mechanisms, where the two offline monitoring mechanisms are an offline monitoring mechanism that is based on heartbeat packets of nodes and an offline monitoring mechanism that is based on a PDO inhibit time. The algorithm resolves technical problems in the prior art in which the limitations of the node offline monitoring mechanism brings adverse effects to network communication. This embodiment of the present disclosure provides a design scheme for a train network node offline monitoring mechanism to integrate the two offline monitoring mechanisms, that is, the offline monitoring mechanism that is based on heartbeat packets of nodes and the offline monitoring mechanism that is based on a PDO inhibit time. In light of different monitoring requirements of different nodes and a check algorithm, a network node decides at its discretion whether to monitor its related nodes by applying the mechanism based on heartbeat packets of nodes or the mechanism based on a PDO inhibit time, thereby effectively avoiding the problem that practical requirements cannot be met by using a single offline monitoring mechanism, enhancing actual effects of redundancy design, and improving safety of the train network.

Accordingly, according to the CANopen-based train network node monitoring method provided in this embodiment of the present disclosure, the train network node obtains, based on a pre-configured network node list, an offline duration that is set on the offline timer corresponding to each node related to the network node, and the heartbeat packet transmission period that is set on the heartbeat timer. The train network node compares the offline duration that is set on the offline timer corresponding to each node with the heartbeat packet transmission period that is set on the heartbeat timer, and determines an offline monitoring mechanism of each node based on a comparison result. In this way, after being powered on, a node automatically applies an appropriate node offline monitoring mechanism to nodes related to the node, thereby improving accuracy of a node detection result determined, helping improve redundancy effects of a train network, and ensuring sound operation of an entire train.

Figure 9:
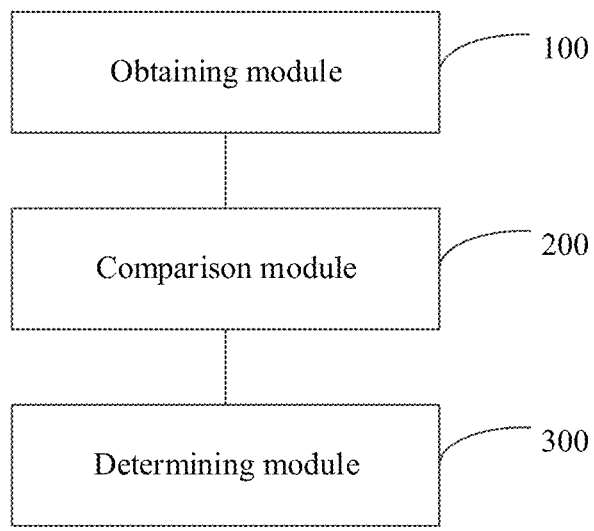
FIG. 9 is a schematic structural diagram of a master node of a train network according to a first embodiment of the present disclosure.

To implement the foregoing embodiments, the present disclosure further provides a train network node. FIG. 9 is a schematic structural diagram of a master node of a train network according to a first embodiment of the present disclosure. As shown in FIG. 9, the node includes an obtaining module 100, a comparison module 200, and a determining module 300.

The obtaining module 100 is configured to obtain an offline duration and a heartbeat packet transmission period based on a pre-configured network node list, where the offline duration is set on an offline timer corresponding to each node related to the network node, and the heartbeat packet transmission period is set on a heartbeat timer.

Figure 10:
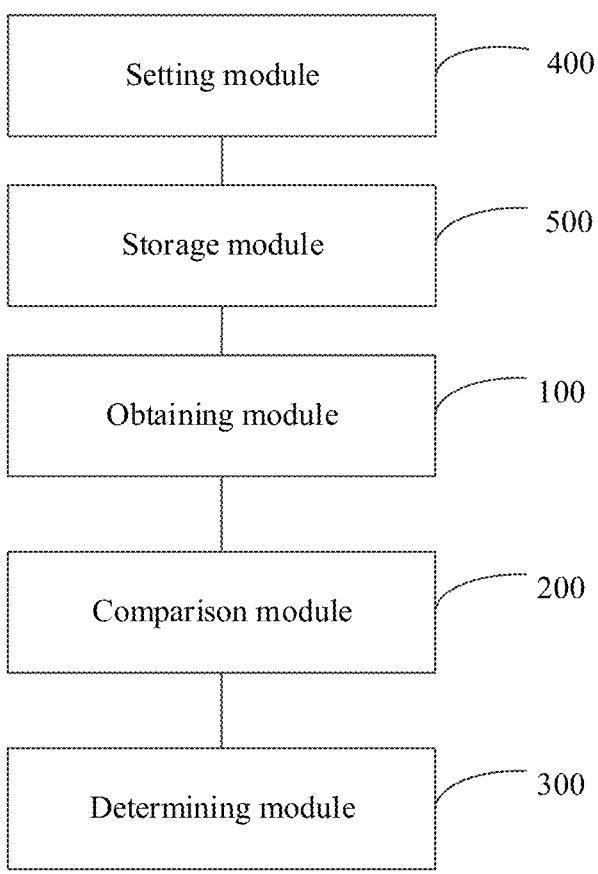
FIG. 10 is a schematic structural diagram of a master node of a train network according to a second embodiment of the present disclosure.

FIG. 10 is a schematic structural diagram of a master node of a train network according to a second embodiment of the present disclosure. As shown in FIG. 10, on the basis of what is shown in FIG. 9, the node further includes a setting module 400 and a storage module 500.

The setting module 400 is configured to set an offline duration of an offline timer corresponding to each node related to a network node.

The storage module 500 is configured to store the offline duration in a storage space corresponding to an object dictionary of the network node.

The comparison module 200 is configured to compare the offline duration that is set on the offline timer corresponding to each node with the heartbeat packet transmission period that is set on the heartbeat timer.

The determining module 300 is configured to determine a offline monitoring mechanism of each node based on a comparison result.

Figure 11:
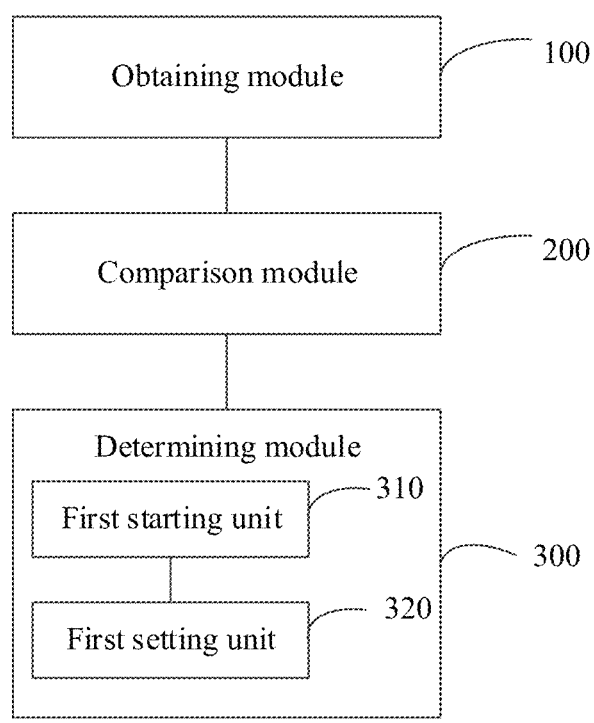
FIG. 11 is a schematic structural diagram of a master node of a train network according to a third embodiment of the present disclosure.

FIG. 11 is a schematic structural diagram of a master node of a train network according to a third embodiment of the present disclosure. As shown in FIG. 11, on the basis of what is shown in FIG. 9, the determining module 300 includes a first starting unit 310 and a first setting unit 320.

The first starting unit 310 is configured to start a heartbeat packet-based monitoring mechanism to determine an offline fault on a related node when it is determined through comparison that an offline duration of a node related to the network node is greater than a heartbeat packet transmission period.

The first setting unit 320 is configured to set a PDO production counter corresponding to the related node to 0.

Figure 12:
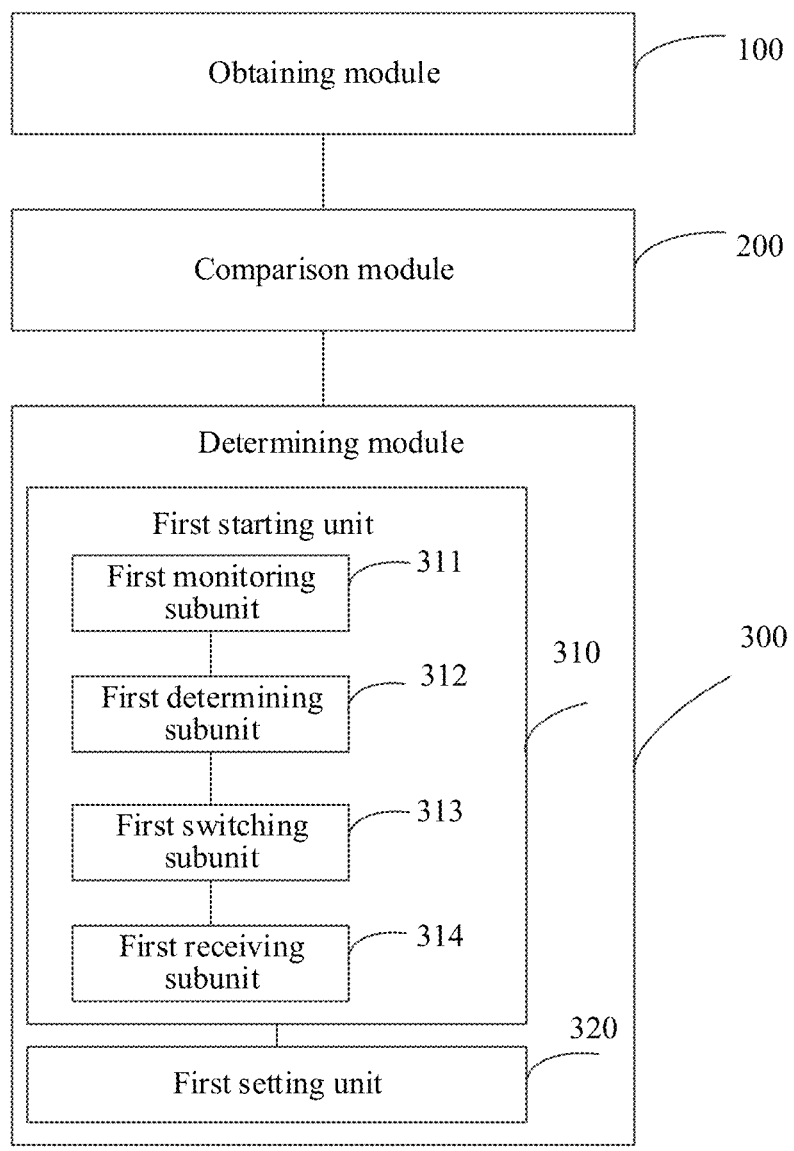
FIG. 12 is a schematic structural diagram of a master node of a train network according to a fourth embodiment of the present disclosure.

FIG. 12 is a schematic structural diagram of a master node of a train network according to a fourth embodiment of the present disclosure. As shown in FIG. 12, on the basis of what is shown in FIG. 11, the first starting unit 310 includes a first monitoring subunit 311, a first determining subunit 312, a first switching subunit 313, and a first receiving subunit 314.

The first monitoring subunit 311 is configured to monitor, on the active network and based on a pre-configured network node list, a heartbeat packet transmitted through the first CAN channel by each slave node related to the active master node.

The first determining subunit 312 is configured to: based on timing of a heartbeat timer that is set corresponding to each slave node and based on receipt status of the heartbeat packet, determine whether a first CAN channel of each slave node is faulty.

The first switching subunit 313 is configured to: if it is determined that no heartbeat packet of a first node is received within a preset first heartbeat period, determine that a first CAN channel of the first node is faulty, and switch to a standby network to monitor the heartbeat packet transmitted by the first node, where the first node is any slave node related to the active master node.

The first receiving subunit 314 is configured to: when a heartbeat packet transmitted by the first node through a second CAN channel is received within the preset first heartbeat period, receive data on the standby network that is transmitted by the first node, and also receive, on the active network, data transmitted by other slave nodes that normally transmit heartbeat packets.

Figure 13:
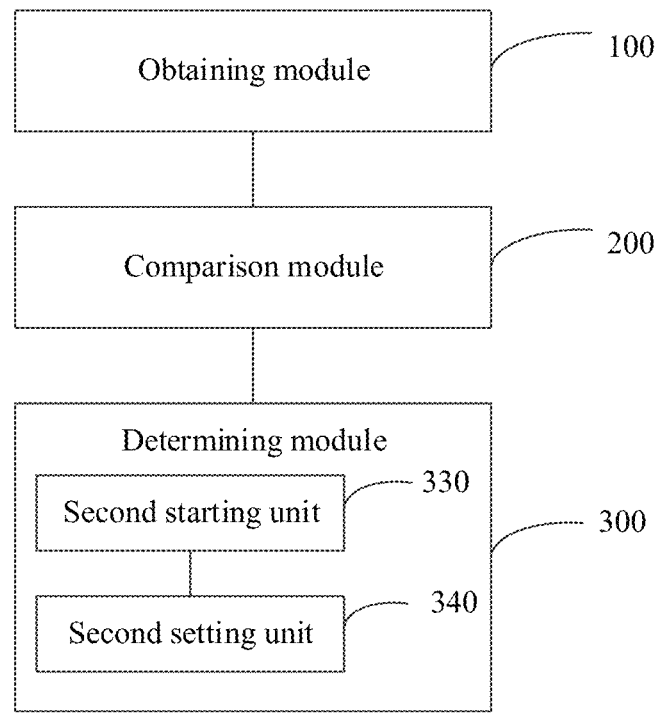
FIG. 13 is a schematic structural diagram of a master node of a train network according to a fifth embodiment of the present disclosure.

FIG. 13 is a schematic structural diagram of a master node of a train network according to a fifth embodiment of the present disclosure. As shown in FIG. 13, on the basis of what is shown in FIG. 9, the determining module 300 includes a second starting unit 330 and a second setting unit 340.

The second starting unit 330 is configured to: when it is determined through comparison that an offline duration of a node related to the network node is less than or equal to a heartbeat packet transmission period, determine a offline fault for a related node by starting a PDO packet-based inhibit time mechanism.

The second setting unit 340 is configured to: based on the offline duration and the PDO packet inhibit time of the related node, set a threshold in a PDO production counter corresponding to the related node.

Figure 14:
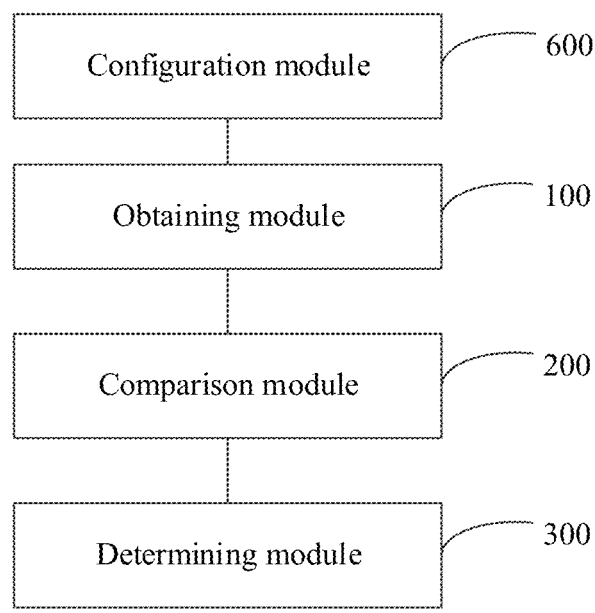
FIG. 14 is a schematic structural diagram of a master node of a train network according to a sixth embodiment of the present disclosure.

FIG. 14 is a schematic structural diagram of a master node of a train network according to a sixth embodiment of the present disclosure. As shown in FIG. 14, on the basis of what is shown in FIG. 9, the node further includes a configuration module 600.

The configuration module 600 is configured to: when a node is added or removed on the train network, reconfigure a network node list that is related to the changed node and a corresponding offline timer to start or stop monitoring an offline of the changed node.

Figure 15:
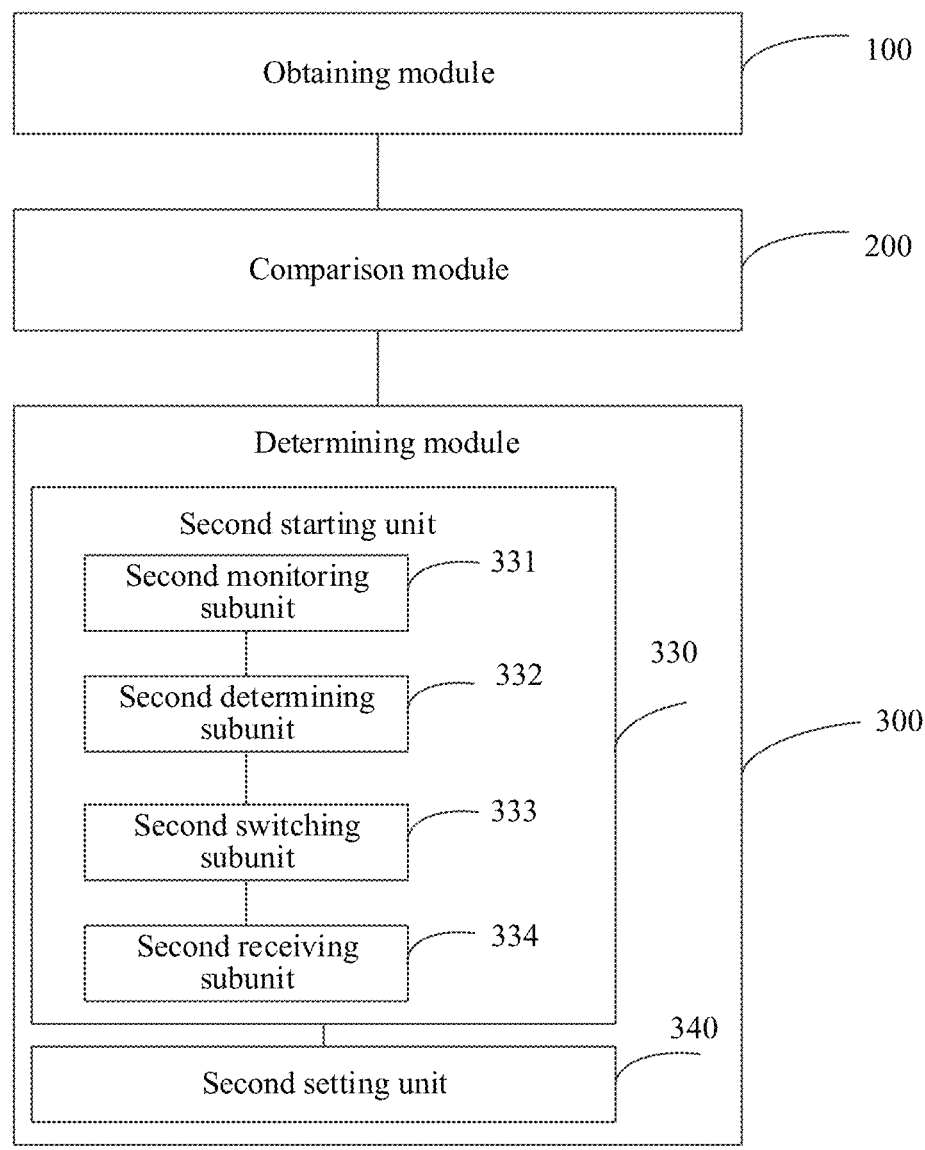
FIG. 15 is a schematic structural diagram of a master node of a train network according to a seventh embodiment of the present disclosure.

FIG. 15 is a schematic structural diagram of a master node of a train network according to a seventh embodiment of the present disclosure. As shown in FIG. 15, on the basis of what is shown in FIG. 13, the second starting unit 330 includes a second monitoring subunit 331, a second determining subunit 332, a second switching subunit 333, and a second receiving subunit 334.

The second monitoring subunit 331 is configured to monitor, on the active network and based on a pre-configured network node list, a PDO packet transmitted through the first CAN channel by each slave node related to the active master node.

The second determining subunit 332 is configured to determine whether the first CAN channel of each slave node is faulty based on receipt status of the PDO packet transmitted by each slave node and timing of the heartbeat timer that is set corresponding to each slave node based on the inhibit time in the PDO packet.

The second switching subunit 333 is configured to: when no PDO packet of the first node is received on the active network within the preset first heartbeat period corresponding to the first node, determine that the first CAN channel of the first node is faulty, and switch to the standby network to monitor a PDO packet transmitted by the first node through the second CAN channel, where the first node is any slave node related to the active master node.

The second receiving subunit 334 is configured to: if a PDO packet transmitted by the first node through the second CAN channel is received on the standby network within the preset first heartbeat period corresponding to the first node, receive the data on the standby network that is transmitted by the first node, and also receive, on the active network, data transmitted by other slave nodes that normally transmit PDO packets.

It should be noted that the foregoing description of the CANopen-based train network node monitoring method is also applicable to the train network node provided in this embodiment of the present disclosure, and details of the train network node are not described exhaustively in this embodiment of the present disclosure.

Accordingly, according to the train network node provided in the embodiment of the present disclosure, the train network node obtains, based on a pre-configured network node list, an offline duration that is set on the offline timer corresponding to each node related to the network node, and the heartbeat packet transmission period that is set on the heartbeat timer. The train network node compares the offline duration that is set on the offline timer corresponding to each node with the heartbeat packet transmission period that is set on the heartbeat timer, and determines an offline monitoring mechanism of each node based on a comparison result. In this way, after being powered on, a node automatically applies an appropriate node offline monitoring mechanism to nodes related to the node, thereby improving accuracy of a node detection result determined, helping improve redundancy effects of a train network, and ensuring sound operation of an entire train.

In description of the present disclosure, description of reference terms such as "one embodiment", "some embodiments", "example", "specific example" or "some examples" means including specific features, structures, materials, or features described in the embodiment or example in at least one embodiment or example of the present disclosure. In this specification, schematic descriptions of the foregoing terms do not necessarily directed at a same embodiment or example. In addition, the described specific features, structures, materials, or features can be combined in a proper manner in any one or more embodiments or examples. In addition, in a case that is not mutually contradictory, a person skilled in the art can combine or group different embodiments or examples that are described in this specification and features of the different embodiments or examples.

Although the embodiments of the present disclosure are shown and described above, it can be understood that, the foregoing embodiments are exemplary, and cannot be construed as a limitation to the present disclosure. Within the scope of the present disclosure, a person of ordinary skill in the art may make changes, modifications, replacement, and variations to the foregoing embodiments.

What is claimed is:

1. A CANopen-based train network node monitoring method comprising:

obtaining, by a train network node, an offline duration and a heartbeat packet transmission period based on a pre-configured network node list, wherein the offline duration is set on an offline timer corresponding to each node related to the network node, and the heartbeat packet transmission period is set on a heartbeat timer; and comparing the offline duration that is set on the offline timer corresponding to each node with the heartbeat packet transmission period that is set on the heartbeat timer, and determining an offline monitoring mechanism of each node based on a comparison result, wherein the determining the offline monitoring mechanism of each node comprises:

starting a heartbeat packet-based monitoring mechanism to determine an offline state of the related node, and setting a process data object (PDO) production counter corresponding to the related node to 0 in response to determining, by means of comparison, that the offline duration of the node related to the network node is greater than the heartbeat packet transmission period; and starting a PDO packet-based inhibit time mechanism to determine an offline state of the related node, and setting, based on the offline duration and an inhibit time in a PDO packet of the related node, a threshold in a PDO production counter corresponding to the related node in response to determining, by means of comparison, that the offline duration of the node related to the network node is less than or equal to the heartbeat packet transmission period.

2. The method according to claim 1, wherein the starting a heartbeat packet based monitoring mechanism to determine an offline state of the related node comprises:

monitoring, based on the pre-configured network node list and on an active network, a heartbeat packet transmitted through a first controller area network (CAN) channel by each slave node related to an active master node;

determining, based on timing of a heartbeat timer that is set corresponding to each slave node and based on receipt status of the heartbeat packet, whether a first CAN channel of each slave node is faulty;

determining, if it is determined that no heartbeat packet of a first node is received within a preset first heartbeat period, that a first CAN channel of the first node is faulty, and switching to a standby network to monitor the heartbeat packet transmitted by the first node, wherein the first node is any slave node related to the active master node; and receiving, if a heartbeat packet transmitted by the first node through a second CAN channel is received within the preset first heartbeat period, data on the standby network that is transmitted by the first node, and also receiving, on the active network, data transmitted by other slave nodes that normally transmit heartbeat packets.

3. The method according to claim 2, wherein after it is determined that no heartbeat packet of the first node is received within the preset first heartbeat period, the method further comprises:

transmitting a reset instruction to the first node from the active network;

continuing to monitor, on the active network, the heartbeat packet transmitted by the first node, and detecting whether the heartbeat packet of the first node is received on the active network within a preset second heartbeat period; and the determining that a first CAN channel of the first node is faulty comprises:

determining, if no heartbeat packet of the first node is received on the active network within the preset second heartbeat period, that the first CAN channel of the first node is faulty.

4. The method according to claim 3, wherein after receiving the heartbeat packet transmitted by the first node through the second CAN channel, the method further comprises:

transmitting a current fault message of the first CAN channel of the first node to an operation monitoring node, and displaying the current fault message to an operator as a prompt of a current fault to be fixed; and continuing to monitor, on the active network, the heartbeat packet transmitted by the first node through the first CAN channel, and determining, if the heartbeat packet of the first node is received within the preset first heartbeat period, that the first CAN channel of the first node has recovered communication, and switching to the active network to receive the data transmitted by the first node.

5. The method according to claim 4, wherein after the switching to the active network to receive the data transmitted by the first node, the method further comprises:

transmitting a historical fault message of the first CAN channel of the first node to the operation monitoring node, and displaying the historical fault message to the operator as a prompt of a latent fault to be fixed.

6. The method according to claim 2, wherein after the switching to the standby network to monitor the heartbeat packet transmitted by the first node, the method further comprises:

transmitting a reset instruction to the first node from the standby network if no heartbeat packet transmitted by the first node through the second CAN channel is received within the preset first heartbeat period;

continuing to monitor, on the standby network, the heartbeat packet transmitted by the first node; and receiving, if a heartbeat packet transmitted by the first node through the second CAN channel is received within the preset second heartbeat period, data on the standby network that is transmitted by the first node, and also receiving, on the active network, data transmitted by other slave nodes that normally transmit heartbeat packets.

7. The method according to claim 6, further comprising:

transmitting, if no heartbeat packet transmitted by the first node through the second CAN channel is received within the preset second heartbeat period, current fault messages of the first CAN channel and the second CAN channel of the first node to the operation monitoring node, and displaying the current fault messages to the operator as a prompt of a current fault to be fixed.

8. The method according to claim 7, further comprising:

continuing to monitor, on the active network and the standby network, the heartbeat packet transmitted by the first node, and if the heartbeat packet of the first node is received from the active network within the preset first heartbeat period, determining that the first CAN channel of the first node has recovered communication, and therefore, switching to the active network to receive the data transmitted by the first node, transmitting a current fault message of the second CAN channel of the first node to the operation monitoring node, and displaying the current fault message to the operator as a prompt of a current fault to be fixed; and continuing to monitor, on the standby network, the heartbeat packet transmitted by the first node through the second CAN channel, and if the heartbeat packet of the first node is received from the standby network within the preset first heartbeat period, transmitting historical fault messages of the first CAN channel and the second CAN channel of the first node to the operation monitoring node, and displaying the historical fault messages to the operator as a prompt of a latent fault to be fixed.

9. The method according to claim 7, further comprising:

continuing to monitor, on the active network and the standby network, the heartbeat packet transmitted by the first node, and if the heartbeat packet of the first node is received from the standby network within the preset first heartbeat period, determining that the second CAN channel of the first node has recovered communication, and therefore, receiving from the standby network the data transmitted by the first node, transmitting a current fault message of the first CAN channel of the first node to the operation monitoring node, and displaying the current fault message to the operator as a prompt of a current fault to be fixed; and continuing to monitor, on the active network, the heartbeat packet transmitted by the first node through the first CAN channel, and if the heartbeat packet of the first node is received from the active network within the preset first heartbeat period, switching to the active network to receive the data transmitted by the first node, transmitting historical fault messages of the first CAN channel and the second CAN channel of the first node to the operation monitoring node, and displaying the historical fault messages to the operator as a prompt of a latent fault to be fixed.

10. The method according to claim 1, wherein the starting a PDO packet based inhibit time mechanism to determine an offline state comprises:

monitoring, based on the pre-configured network node list and on the active network, a PDO packet transmitted through the first controller area network (CAN) channel by each slave node related to the active master node;

determining whether the first CAN channel of each slave node is faulty based on receipt status of the PDO packet transmitted by each slave node and timing of the heartbeat timer that is set corresponding to each slave node based on the inhibit time in the PDO packet;

determining, if no PDO packet of the first node is received on the active network within the preset first heartbeat period corresponding to the first node, that the first CAN channel of the first node is faulty, and switching to the standby network to monitor a PDO packet transmitted by the first node through the second CAN channel, wherein the first node is any slave node related to the active master node; and receiving, if a PDO packet transmitted by the first node through the second CAN channel is received on the standby network within the preset first heartbeat period corresponding to the first node, the data on the standby network that is transmitted by the first node, and also receiving, on the active network, data transmitted by other slave nodes that normally transmit PDO packets.

11. The method according to claim 10, wherein after no PDO packet of the first node is received on the active network within the preset first heartbeat period corresponding to the first node, the method further comprises:

transmitting a reset instruction to the first node from the active network;

continuing to monitor, on the active network, the PDO packet transmitted by the first node, and detecting whether the PDO packet of the first node is received on the active network within a preset second heartbeat period corresponding to the first node; and the determining that a first CAN channel of the first node is faulty comprises:

determining, if no PDO packet of the first node is received on the active network within the preset second heartbeat period corresponding to the first node, that the first CAN channel of the first node is faulty.

12. The method according to claim 10, wherein after receiving the PDO packet transmitted by the first node through the second CAN channel, the method further comprises:

transmitting a current fault message of the first CAN channel of the first node to an operation monitoring node, and displaying the current fault message to an operator as a prompt of a current fault to be fixed; and continuing to monitor, on the active network, the PDO packet transmitted by the first node through the first CAN channel, and determining, if the PDO packet of the first node is received within the preset first heartbeat period corresponding to the first node, that the first CAN channel of the first node has recovered communication, and switching to the active network to receive the data transmitted by the first node.

13. The method according to claim 12, wherein after the switching to the active network to receive the data transmitted by the first node, the method further comprises:

transmitting a historical fault message of the first CAN channel of the first node to the operation monitoring node, and displaying the historical fault message to the operator as a prompt of a latent fault to be fixed.

14. The method according to claim 10, wherein after the switching to the standby network to monitor the PDO packet transmitted by the first node through the second CAN channel, the method further comprises:

transmitting, if no PDO packet of the first node is received on the standby network within the preset first heartbeat period corresponding to the first node, a reset instruction to the first node from the standby network, and continuing to monitor, on the standby network, the PDO packet transmitted by the first node; and receiving, if the PDO packet transmitted by the first node is received on the standby network within the preset second heartbeat period corresponding to the first node, the data on the standby network that is transmitted by the first node, and also receiving, on the active network, the data transmitted by other slave nodes that normally transmit PDO packets.

15. The method according to claim 14, further comprising:

transmitting, if no PDO packet transmitted by the first node is received on the standby network within the preset second heartbeat period corresponding to the first node, current fault messages of the first CAN channel and the second CAN channel of the first node to the operation monitoring node, and displaying the current fault messages to the operator as a prompt of a current fault to be fixed.

16. The method according to claim 15, further comprising:

continuing to monitor, on the active network and the standby network, the PDO packet transmitted by the first node, and if the PDO packet of the first node is received from the active network within the preset first heartbeat period corresponding to the first node, determining that the first CAN channel of the first node has recovered communication, and therefore, switching to the active network to receive the data transmitted by the first node, transmitting a current fault message of the second CAN channel of the first node to the operation monitoring node, and displaying the current fault message to the operator as a prompt of a current fault to be fixed; and continuing to monitor, on the standby network, the PDO packet transmitted by the first node, and if the PDO packet of the first node is received from the standby network within the preset first heartbeat period corresponding to the first node, transmitting historical fault messages of the first CAN channel and the second CAN channel of the first node to the operation monitoring node, and displaying the historical fault messages to the operator as a prompt of a latent fault to be fixed.

17. The method according to claim 15, further comprising:
- continuing to monitor, on the active network and the standby network, the PDO packet transmitted by the first node, and if the PDO packet of the first node is received from the standby network within the preset first heartbeat period corresponding to the first node, determining that the second CAN channel of the first node has recovered communication, and therefore, receiving from the standby network the data transmitted by the first node, transmitting a current fault message of the first CAN channel of the first node to the operation monitoring node, and displaying the current fault message to the operator as a prompt of a current fault to be fixed; and
- continuing to monitor, on the active network, the PDO packet transmitted by the first node through the first CAN channel, and if the PDO packet of the first node is received from the active network within the preset first heartbeat period corresponding to the first node, switching to the active network to receive the data transmitted by the first node, transmitting historical fault messages of the first CAN channel and the second CAN channel of the first node to the operation monitoring node, and displaying the historical fault messages to the operator as a prompt of a latent fault to be fixed.

18. A train network node, comprising:
- a processor; and a memory storing computer program executable by the processor, wherein the processor is configured to:
- obtain an offline duration and a heartbeat packet transmission period based on a pre-configured network node list, wherein the offline duration is set on an offline timer corresponding to each node related to the network node, and the heartbeat packet transmission period is set on a heartbeat timer; and
- compare the offline duration that is set on the offline timer corresponding to each node with the heartbeat packet transmission period that is set on the heartbeat timer; and
- determine an offline monitoring mechanism of each node based on a comparison result, wherein the determining the offline monitoring mechanism of each node comprises:
- start a heartbeat packet-based monitoring mechanism to determine an offline state of the related node, and setting a process data object (PDO) production counter corresponding to the related node to 0 in response to determining, by means of comparison, that the offline duration of the node related to the network node is greater than the heartbeat packet transmission period; and
- start a PDO packet-based inhibit time mechanism to determine an offline state of the related node, and setting, based on the offline duration and an inhibit time in a PDO packet of the related node, a threshold in a PDO production counter corresponding to the related node in response to determining, by means of comparison, that the offline duration of the node related to the network node is less than or equal to the heartbeat packet transmission period.

* * * * *